United States Patent
Takii et al.

(10) Patent No.: US 11,584,298 B2
(45) Date of Patent: Feb. 21, 2023

(54) VEHICLE DISPLAY SYSTEM AND VEHICLE

(71) Applicant: KOITO MANUFACTURING CO., LTD., Tokyo (JP)

(72) Inventors: Naoki Takii, Shizuoka (JP); Misako Kamiya, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/268,576

(22) PCT Filed: Aug. 7, 2019

(86) PCT No.: PCT/JP2019/031121
§ 371 (c)(1),
(2) Date: Feb. 15, 2021

(87) PCT Pub. No.: WO2020/036108
PCT Pub. Date: Feb. 20, 2020

(65) Prior Publication Data
US 2021/0162927 A1  Jun. 3, 2021

(30) Foreign Application Priority Data

Aug. 15, 2018  (JP) .............................. JP2018-152958
Aug. 15, 2018  (JP) .............................. JP2018-152959

(51) Int. Cl.
*B60R 1/00*  (2022.01)
*G06F 3/14*  (2006.01)
(Continued)

(52) U.S. Cl.
CPC ................ *B60R 1/00* (2013.01); *B60Q 1/503* (2013.01); *B60Q 9/00* (2013.01); *G02B 27/0101* (2013.01);
(Continued)

(58) Field of Classification Search
CPC .......................... B60R 2300/205; B60R 11/04
See application file for complete search history.

(56) References Cited

U.S. PATENT DOCUMENTS 10,282,915 B1 * 5/2019 Lin .................... G01C 21/3647
2003/0146827 A1   8/2003 Koike
(Continued)

FOREIGN PATENT DOCUMENTS

CN  107264399 A  10/2017
JP  2003231450 A  8/2003
(Continued)

OTHER PUBLICATIONS

International Search Report issued in corresponding International Application No. PCT/JP2019/031121; dated Oct. 29, 2019 (5 pages).
(Continued)

*Primary Examiner* — Nan-Ying Yang
(74) *Attorney, Agent, or Firm* — Osha Bergman Watanabe & Burton LLP

(57) ABSTRACT

A vehicle display system is provided in a vehicle. The vehicle display system includes a first display device and a second display device. The first display device is configured to emit a light pattern toward a road surface outside the vehicle. The second display device is located inside the vehicle and is configured to display an image indicating the light pattern as viewed from above.

7 Claims, 17 Drawing Sheets

(51) Int. Cl.

| | | |
|---|---|---|
| *G02B 27/01* | (2006.01) | |
| *B60Q 1/50* | (2006.01) | |
| *B60Q 9/00* | (2006.01) | |
| *H04N 7/18* | (2006.01) | |
| *B60Q 1/00* | (2006.01) | |
| *B60Q 1/04* | (2006.01) | |

(52) U.S. Cl.
CPC ............ *G06F 3/1423* (2013.01); *H04N 7/18* (2013.01); *B60Q 1/0017* (2013.01); *B60Q 1/04* (2013.01); *B60R 2300/10* (2013.01); *B60R 2300/205* (2013.01); *G02B 2027/0138* (2013.01); *G02B 2027/0141* (2013.01)

(56) References Cited

U.S. PATENT DOCUMENTS

| | | | | |
|---|---|---|---|---|
| 2004/0041983 | A1* | 3/2004 | Bleiner | B60Q 1/52 353/13 |
| 2006/0235597 | A1 | 10/2006 | Hori et al. | |
| 2012/0229645 | A1 | 9/2012 | Yamada | |
| 2015/0145698 | A1* | 5/2015 | Werner | G08G 1/0112 340/928 |
| 2015/0298598 | A1* | 10/2015 | Nussli | B60Q 1/2665 345/2.2 |
| 2017/0255093 | A1 | 9/2017 | Fujita et al. | |
| 2017/0282797 | A1 | 10/2017 | Saito et al. | |
| 2017/0337821 | A1 | 11/2017 | Masuda et al. | |
| 2018/0126897 | A1* | 5/2018 | Hamada | B60Q 9/008 |
| 2018/0260182 | A1* | 9/2018 | Suzuki | G09G 5/40 |
| 2019/0051185 | A1 | 2/2019 | Masuda et al. | |

FOREIGN PATENT DOCUMENTS

| | | |
|---|---|---|
| JP | 2005297863 A | 10/2005 |
| JP | 2006244143 A | 9/2006 |
| JP | 2011105084 A | 6/2011 |
| JP | 2016055691 A | 4/2016 |
| JP | 2017159698 A | 9/2017 |

OTHER PUBLICATIONS

Written Opinion of the International Searching Authority issued in corresponding International Application No. PCT/JP2019/031121; dated Oct. 29, 2019 (5 pages).

First Office Action in corresponding Chinese Application No. 201910733077.2, dated Aug. 22, 2022 (26 pages).

* cited by examiner

VEHICLE DISPLAY SYSTEM AND VEHICLE

TECHNICAL FIELD

The present disclosure relates to a vehicle display system and a vehicle including the vehicle display system.

BACKGROUND ART

There is known a vehicle display system in which vehicle information is notified/warned to a driver (an occupant) himself/herself or others (an object) such as a pedestrian or an oncoming vehicle by emitting (projecting) a light pattern such as a figure or characters onto a road surface (Patent Literature 1). Visual communication between the vehicle and the object may be realized by visually presenting information on the vehicle to the object such as the pedestrian by the light pattern projected on the road surface.

CITATION LIST

Patent Literature

Patent Literature 1: JP2016-055691A

SUMMARY OF INVENTION

Technical Problem

When the light pattern is presented toward the object, the light pattern is projected on the road surface in consideration of a viewpoint of the object.

Since viewpoints of the occupant and the object are different from each other, a shape of the light pattern seen by the occupant may be different from a shape of the light pattern seen by the object. For this reason, the occupant may not be able to accurately recognize what kind of light pattern is presented to the object.

By displaying the light pattern, a notification/warning of presence of the vehicle or a predetermined operation of the vehicle is given to the object, but the object may not notice the light pattern. When the object is present in an area outside a field of view of the occupant, the occupant may not be able to recognize presence of the object, and the notification/warning by another method may not be possible.

An object of the display system present disclosure is to provide a vehicle display system that allows an occupant to accurately recognize visual communication between a vehicle and an object, and a vehicle including the vehicle display system.

Another object of the present disclosure is to provide a vehicle display system capable of presenting presence of an object to an occupant by a relatively simple method, and a vehicle including the vehicle display system.

Solution to Problem

A vehicle display system according to an aspect of the present disclosure, the vehicle display system, provided in a vehicle, includes:

a first display device configured to emit a light pattern toward a road surface outside the vehicle; and a second display device located inside the vehicle and configured to display an image indicating the light pattern as viewed from above.

According to the above configuration, the first display device emits the light pattern toward the road surface, and the second display device displays the image indicating the light pattern as viewed from above. Therefore, the occupant may be able to accurately recognize a shape of the light pattern projected on the road surface. As described above, it is possible to provide the vehicle display system that allows the occupant to accurately recognize visual communication between the vehicle and the object.

The image indicating the light pattern as viewed from above may be an image obtained by capturing the light pattern with at least one camera provided in the vehicle.

According to the above configuration, the second display device displays the image of the light pattern captured by at least one camera provided in the vehicle. Therefore, the occupant may recognize the actually displayed shape of the light pattern toward the object.

The image indicating the light pattern as viewed from above may be a computer graphics (CG) image indicating a virtual object in which the light pattern is virtually viewed from above.

According to the above configuration, the second display device displays the CG image indicating the virtual object in which the light pattern is virtually viewed from above. Therefore, the occupant may easily recognize the shape of the light pattern toward the object from the CG image.

The second display device may display a CG image indicating a virtual object in which the vehicle is virtually viewed from above.

According to the above configuration, the second display device displays the CG image indicating the virtual object in which the vehicle is virtually viewed from above together with the image indicating the light pattern as viewed from above. Therefore, the occupant may grasp a positional relationship between the vehicle and the light pattern.

The light pattern may include a light pattern toward an object outside the vehicle, and the second display device may display a CG image indicating a virtual object of the object.

According to the above configuration, the second display device displays the CG image indicating the virtual object of the object together with the image indicating the light pattern as viewed from above. Therefore, the occupant may be able to grasp a positional relationship between the object and the light pattern and a line of sight of the object with respect to the light pattern.

A vehicle including the above vehicle display system may be provided.

According to the above configuration, it is possible to provide the vehicle display system that allows the occupant to accurately recognize the visual communication between the vehicle and the object.

A vehicle display system according to another aspect of the present disclosure, the vehicle display system, provided in a vehicle, includes:

a first display device configured to emit a light pattern toward a road surface outside the vehicle;

a determination unit configured to determine whether the light pattern is changed due to an object based on an image obtained by capturing the light pattern emitted by the first display device; and an output unit configured to output a predetermined message to an occupant of the vehicle according to a determination result of the determination unit.

According to the above configuration, the predetermined message is output to the occupant according to the determination result of whether the light pattern emitted toward the road surface is changed due to the object. For example, when the light pattern is changed due to presence of the object, the occupant may be notified of the presence of the object. In this way, it is possible to provide the vehicle display system capable of presenting the presence of the object to the occupant by a relatively simple method.

The first display device may be configured to emit the light pattern toward the road surface around the vehicle.

According to the above configuration, the light pattern is emitted toward the road surface around the vehicle. Therefore, the occupant may recognize the object present around the vehicle by a change in the light pattern.

The light pattern may be a light pattern surrounding a periphery of the vehicle.

According to the above configuration, the light pattern is emitted around the vehicle. Therefore, the occupant may recognize that the object is present at a position where the change in the light pattern occurs.

The light pattern may be a light pattern emitted to a region behind the vehicle.

According to the above configuration, the light pattern is emitted to the region behind the vehicle. Therefore, the occupant may recognize the object present in the region behind the vehicle outside a field of view of the occupant.

The output unit may include a second display device located inside the vehicle and configured to display information on the vehicle, and the predetermined message may be displayed on the second display device.

According to the above configuration, the predetermined message is displayed on the second display device. Therefore, the occupant may visually recognize the predetermined message.

The output unit may include a sound output device located inside the vehicle and configured to output a predetermined notification sound, and the predetermined message may be output as the notification sound from the sound output device.

According to the above configuration, the predetermined message is output as the notification sound from the sound output device. Therefore, the occupant may audibly recognize the predetermined message.

The second display device may be configured to output the predetermined message as a notification sound.

According to the above configuration, the second display device outputs the predetermined message as the notification sound. Therefore, the occupant may audibly recognize the predetermined message.

The determination unit may determine whether the light pattern is changed due to the object based on the image obtained by capturing the light pattern emitted by the first display device and information on the vehicle.

According to the above configuration, the determination unit determines whether the light pattern is changed due to the object based on the captured image of the light pattern emitted toward the road surface and the information on the vehicle. Thereby, for example, a change in the light pattern due to the object and a change in the light pattern due to other causes than the object may be distinguished from each other. In this way, the presence of the object may be presented to the occupant by a more accurate method.

The determination unit may calculate, based on a captured image of the light pattern obtained by capturing before an elapse of a predetermined time, a ratio of change of the light pattern of the captured image to a reference light pattern, calculate, based on an image of the light pattern obtained by capturing after the elapse of the predetermined time, a ratio of change of the light pattern of the captured image to the reference light pattern, and compare the ratios of change of the light pattern of the captured image captured before and after the elapse of the predetermined time to the reference light pattern.

The output unit may update the predetermined message and output the updated predetermined message to the occupant of the vehicle according to a comparison result of the determination unit.

According to the above configuration, the predetermined message is updated and output based on the comparison result of the ratios of change of the light pattern of the captured image captured before and after the elapse of the predetermined time to the reference light pattern. Thereby, the occupant of the vehicle may confirm a moving direction of the object.

A vehicle may be provided including: the above vehicle display system; and at least one camera configured to capture the light pattern emitted by the first display device.

According to the above configuration, it is possible to provide the vehicle including the vehicle display system capable of presenting the presence of the object to the occupant by a relatively simple method.

Advantageous Effects of Invention

According to the present disclosure, it is possible to provide a vehicle display system that allows an occupant to accurately recognize visual communication between a vehicle and an object, and a vehicle including the vehicle display system.

According to the present disclosure, it is possible to provide a vehicle display system capable of presenting presence of an object to an occupant by a relatively simple method, and a vehicle including the vehicle display system.

DESCRIPTION OF EMBODIMENTS

Figure 1:
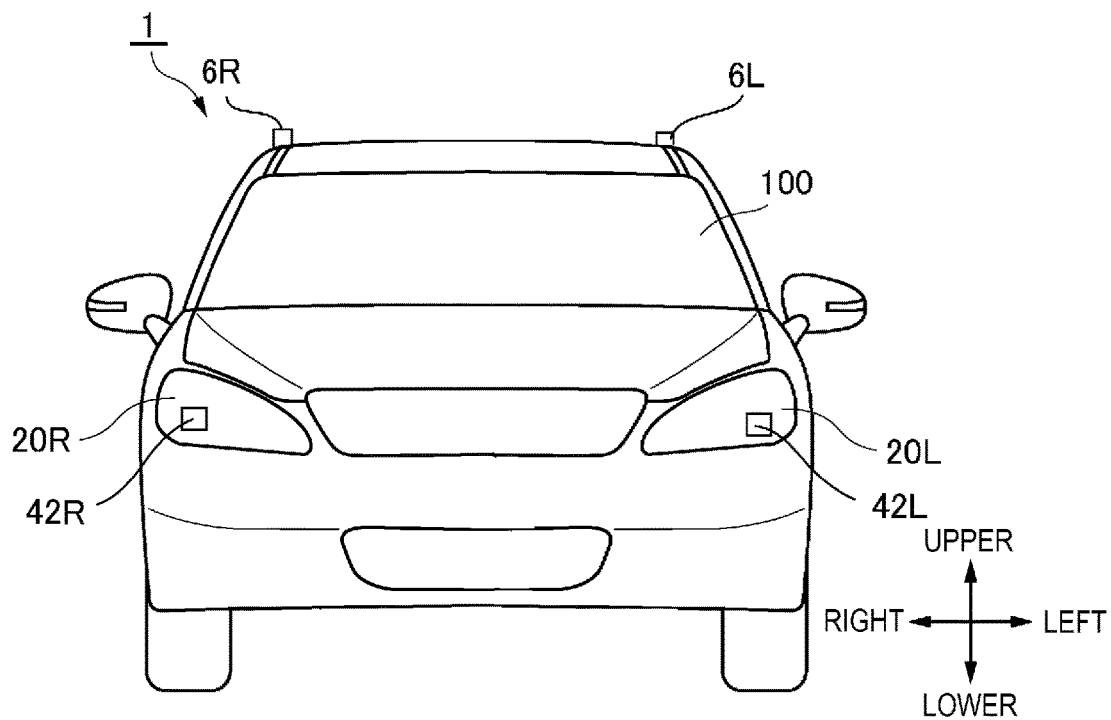
FIG. 1 is a front view of a vehicle equipped with a vehicle system.

Hereinafter, first to seventh embodiments of the present invention will be described with reference to the drawings. Dimensions of members shown in the drawings may be different from actual dimensions of the members for convenience of description.

In the description of the first to seventh embodiments of the present invention, a "left-right direction," a "front-rear direction" and an "upper-lower direction" are appropriately referred to for convenience of description. These directions are relative directions as viewed from an occupant of a vehicle 1 in FIG. 1. Here, the "left-right direction" is a direction including a "left direction" and a "right direction." The "upper-lower direction" is a direction including an "upper direction" and a "lower direction." The "front-rear direction" is a direction including a "front direction" and a "rear direction." The left-right direction is a direction orthogonal to the upper-lower direction. The front-rear direction is a direction orthogonal to the left-right direction and the upper-lower direction.

First Embodiment

Hereinafter, a first embodiment of the present invention (hereinafter, referred to as the first embodiment) will be described with reference to the drawings.

Figure 2:
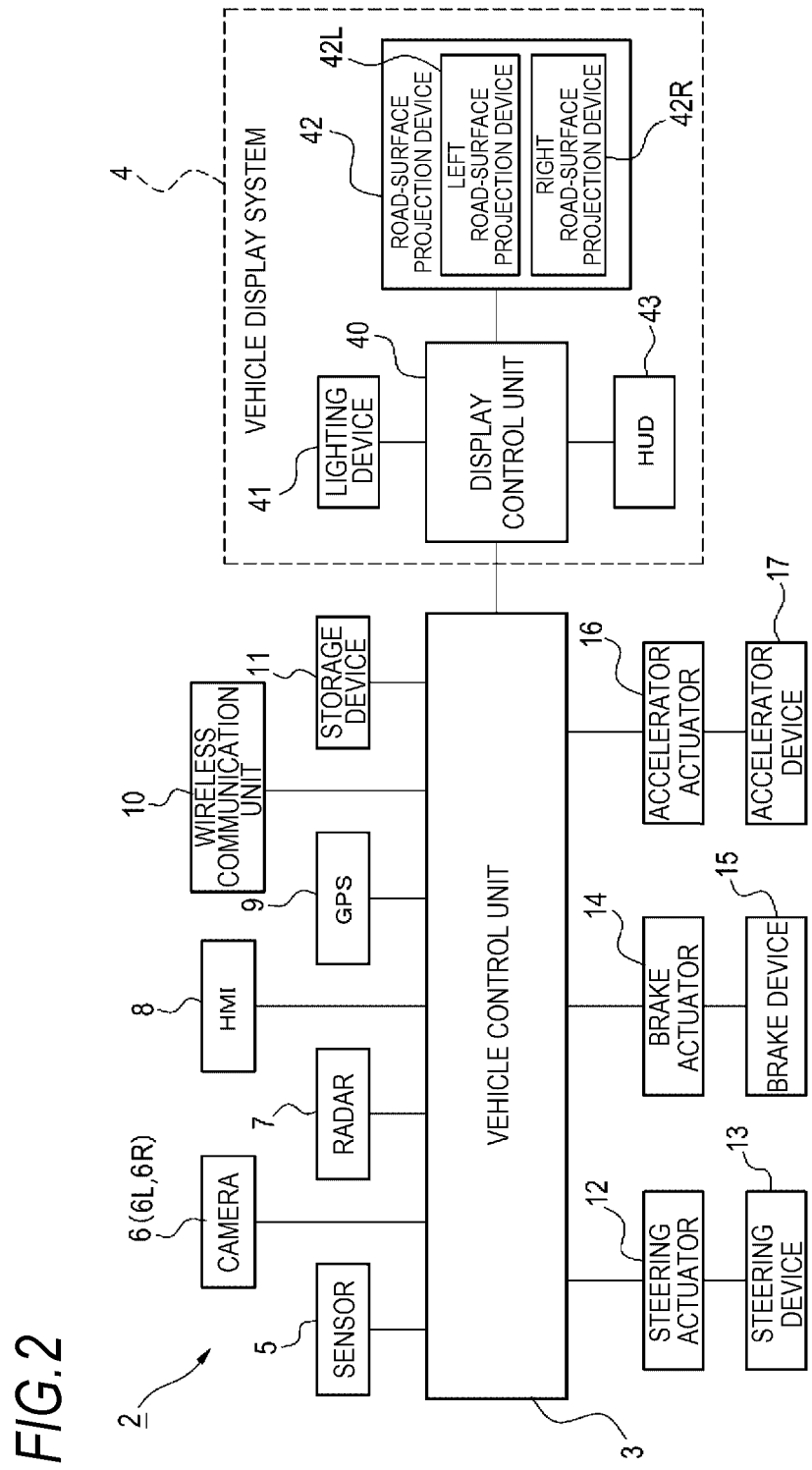
FIG. 2 is a block diagram of the vehicle system according to a first embodiment of the present invention.

First, a vehicle system 2 according to the first embodiment will be described below with reference to FIGS. 1 and 2. FIG. 1 is a front view of the vehicle 1 equipped with the vehicle system 2. FIG. 2 is a block diagram of the vehicle system 2 according to the first embodiment. The vehicle 1 is a vehicle (an automobile) capable of traveling in an automated driving mode.

As shown in FIG. 2, the vehicle system 2 includes a vehicle control unit 3, a vehicle display system 4 (hereinafter, simply referred to as a "display system 4"), a sensor 5, a camera 6, and a radar 7. The vehicle system 2 further includes a human machine interface (HMI) 8, a global positioning system (GPS) 9, a wireless communication unit 10, and a storage device 11. The vehicle system 2 further includes a steering actuator 12, a steering device 13, a brake actuator 14, a brake device 15, an accelerator actuator 16, and an accelerator device 17.

The vehicle control unit 3 is configured to control traveling of the vehicle 1. The vehicle control unit 3, for example, includes at least one electronic control unit (ECU). The electronic control unit includes a computer system (for example, a system on a chip (SoC)) including one or more processors and one or more memories, and an electronic circuit including an active element such as a transistor and a passive element. The processor is, for example, a central processing unit (CPU), a micro processing unit (MPU), a graphics processing unit (GPU), and/or a tensor processing unit (TPU). The CPU may include a plurality of CPU cores. The GPU may include a plurality of GPU cores. The memory includes a read only memory (ROM) and a random access memory (RAM). The ROM may store a vehicle control program. For example, the vehicle control program may include an artificial intelligence (AI) program for automated driving. The AI program is a program constructed by supervised or unsupervised machine learning (particularly, deep learning) using a multilayer neural network. The RAM may temporarily store a vehicle control program, vehicle control data, and/or surrounding environment information indicating a surrounding environment of the vehicle. The processor may be configured to develop a program designated from various vehicle control programs stored in the ROM on the RAM and execute various types of processing in cooperation with the RAM. The computer system may include a non-Neumann type computer such as an application specific integrated circuit (ASIC) or a field-programmable gate array (FPGA). Further, the computer system may include a combination of a Neumann type computer and a non-Neumann type computer.

The sensor 5 includes an acceleration sensor, a speed sensor, a gyro sensor, and the like. The sensor 5 is configured to detect a traveling state of the vehicle 1 and output traveling state information to the vehicle control unit 3. The sensor 5 may further include a seating sensor that detects whether a driver is seated in a driver seat, a face orientation sensor that detects a direction of a face of the driver, an external weather sensor that detects an external weather condition, a human sensor that detects whether there is a person in the vehicle, or the like.

The camera 6 is, for example, a camera including an imaging element such as a charge-coupled device (CCD) or a complementary MOS (CMOS). The camera 6 is configured to acquire image data indicating a surrounding environment of the vehicle 1 and then transmit the image data to the vehicle control unit 3. The vehicle control unit 3 acquires the surrounding environment information based on the transmitted image data. Here, the surrounding environment information may include information on an object (a pedestrian, other vehicles, a sign, or the like) present outside the vehicle 1. For example, the surrounding environment information may include information on an attribute of the object present outside the vehicle 1 and information on a distance or a position of the object with respect to the vehicle 1. The camera 6 may be configured as a monocular camera or a stereo camera.

The camera 6 is configured to acquire image data indicating a light pattern projected on a road surface and then transmit the image data to the vehicle control unit 3. As a camera that captures the light pattern, a dedicated camera may be provided, or a camera used for other purposes (for example, a rear vision camera and other camera for capturing a surrounding environment of the vehicle 1) may be used. In the first embodiment, the camera 6 includes a left camera 6L and a right camera 6R that capture the light pattern projected on the road surface. In the following description, the left camera 6L and the right camera 6R may be referred to as the cameras 6L, 6R or simply the camera 6. As shown in FIG. 1, the cameras 6L, 6R are disposed at both end portions of a front side of a vehicle body roof in the left-right direction, but the number, arrangement positions, and shapes of the cameras 6 are not particularly limited as long as the camera 6 may capture the light pattern projected on the road surface. For example, the cameras 6L, 6R may be disposed at positions lower than the vehicle body roof. When the number of the cameras 6 is one, the camera 6 may be disposed in a center of the front side or a rear side of the vehicle body roof in the left-right direction. When the number of the cameras 6 is four, one camera 6 may be mounted on each of four corners (a left front corner, a right front corner, a left rear corner, and a right rear corner) of the vehicle body roof. The camera used for other purposes (for example, the rear vision camera and other camera for capturing the surrounding environment of vehicle 1) may be used without separately providing the cameras 6L, 6R dedicated to light pattern imaging. In this case, image processing or the like for extracting an image of the light pattern from a captured image is performed as necessary.

The radar 7 is a millimeter wave radar, a microwave radar, a laser radar (for example, a LiDAR unit), and/or the like. For example, the LiDAR unit is configured to detect the surrounding environment of the vehicle 1. In particular, the LiDAR unit is configured to acquire 3D mapping data (point cloud data) indicating the surrounding environment of the vehicle 1 and then transmit the 3D mapping data to the vehicle control unit 3. The vehicle control unit 3 specifies the surrounding environment information based on the transmitted 3D mapping data.

The HMI 8 includes an input unit that receives an input operation from the driver, and an output unit that outputs traveling information and the like to the driver. The input unit includes a steering wheel, an accelerator pedal, a brake pedal, a driving mode switching switch that switches a driving mode of the vehicle 1, and the like. The input unit and the output unit may include a touch panel capable of receiving the input operation and displaying an image to the occupant. The GPS 9 is configured to acquire current position information of the vehicle 1 and output the acquired current position information to the vehicle control unit 3. The current position information includes GPS coordinates (latitude and longitude) of the vehicle 1.

The wireless communication unit 10 is configured to receive information on other vehicles around the vehicle 1 (for example, traveling information) from other vehicles and transmit information (for example, traveling information) on the vehicle 1 to other vehicles (inter-vehicle communication). The wireless communication unit 10 is configured to receive infrastructure information from infrastructure equipment such as a traffic light or a sign lamp and transmit the traveling information on the vehicle 1 to the infrastructure equipment (road-vehicle communication). The wireless communication unit 10 is configured to receive information on a pedestrian from a portable electronic device (a smart phone, a tablet, a wearable device, or the like) carried by the pedestrian and transmit the own vehicle traveling information on the vehicle 1 to the portable electronic device (pedestrian-vehicle communication). The vehicle 1 may communicate with other vehicles, the infrastructure equipment, or the portable electronic device in an ad-hoc mode directly or via an access point. The vehicle 1 may communicate with other vehicles, the infrastructure equipment, or the portable electronic device via a communication network such as the Internet. A wireless communication standard is, for example, Wi-Fi (registered trademark), Bluetooth (registered trademark), ZigBee (registered trademark), LPWA, DSRC (registered trademark), or Li-Fi. The vehicle 1 may communicate with other vehicles, the infrastructure equipment, or the portable electronic device using a fifth generation mobile communication system (5G).

The storage device 11 is an external storage device such as a hard disk drive (HDD) or a solid state drive (SSD). The storage device 11 may store 2D or 3D map information and/or a vehicle control program. For example, the 3D map information may include point cloud data. The storage device 11 is configured to output the map information and the vehicle control program to the vehicle control unit 3 in response to a request from the vehicle control unit 3. The map information and the vehicle control program may be updated via the wireless communication unit 10 and a communication network such as the Internet.

The display system 4 according to the first embodiment includes a display control unit 40, a lighting device 41, a road-surface projection device 42, and a head-up display (HUD) 43. The road-surface projection device 42 is an example of a first display device. The HUD 43 is an example of a second display device.

The lighting device 41 is configured to emit light toward outside of the vehicle 1. The lighting device 41 includes a left headlamp 20L and a right headlamp 20R. The lighting device 41 may include, in addition to the headlamps 20L, 20R, a position lamp provided at a front portion of the vehicle 1, a rear combination lamp provided at a rear portion of the vehicle 1, turn signal lamps provided at the front portion or side portions of the vehicle, and various lamps that inform the pedestrian and drivers of other vehicles of a situation of the own vehicle.

The road-surface projection device 42 is configured to emit a light pattern toward the road surface outside the vehicle 1. The road-surface projection device 42 includes two road-surface projection devices (a left road-surface projection device 42L and a right road-surface projection device 42R). As shown in FIG. 1, the left road-surface projection device 42L is mounted in the left headlamp 20L, and the right road-surface projection device 42R is mounted in the right headlamp 20R. In the following description, the left road-surface projection device 42L and the right road-surface projection device 42R may be referred to as the road-surface projection devices 42L, 42R or simply the road-surface projection device 42.

The road-surface projection device 42 includes, for example, a laser light source configured to emit laser light, a light deflection device configured to deflect the laser light emitted from the laser light source, and an optical system member such as a lens. The laser light source is, for example, RGB laser light sources configured to respectively emit red laser light, green laser light, and blue laser light. The light deflection device is, for example, a micro electro mechanical systems (MEMS) mirror, a galvanometer mirror, a polygon mirror, or the like. The road-surface projection device 42 is configured to project a light pattern M0 (see FIG. 4A) on the road surface by scanning with the laser light. When the laser light source is the RGB laser light sources, the road-surface projection device 42 may project light patterns of various colors on the road surface. The road-surface projection devices 42L, 42R may project different light patterns on the road surface or may project one light pattern on the road surface by combining the respective light patterns.

Although the road-surface projection device 42 includes the road-surface projection devices 42L, 42R mounted in the headlamps 20L, 20R in the first embodiment, the number, arrangement positions, and shapes of the road-surface projection devices 42 are not particularly limited as long as the road-surface projection device 42 may project the light pattern on the road surface. For example, the road-surface projection devices 42L, 42R may be disposed in vicinity of the headlamps. The road-surface projection devices 42L, 42R may be mounted in a left rear combination lamp (not shown) and a right rear combination lamp (not shown) or in vicinity thereof. When the number of the road-surface projection devices 42 is one, the road-surface projection device 42 may be disposed in the center of the front side or the rear side of the vehicle body roof in the left-right direction. When the number of the road-surface projection devices 42 is four, one road-surface projection device 42 may be mounted in or in vicinity of each of the left headlamp 20L, the right headlamp 20R, the left rear combination lamp (not shown), and the right rear combination lamp (not shown).

A projection method of the road-surface projection device 42 may be a digital light processing (DLP) method or a liquid crystal on silicon (LCOS) method. In this case, an LED is used as a light source instead of laser.

Figure 4A:
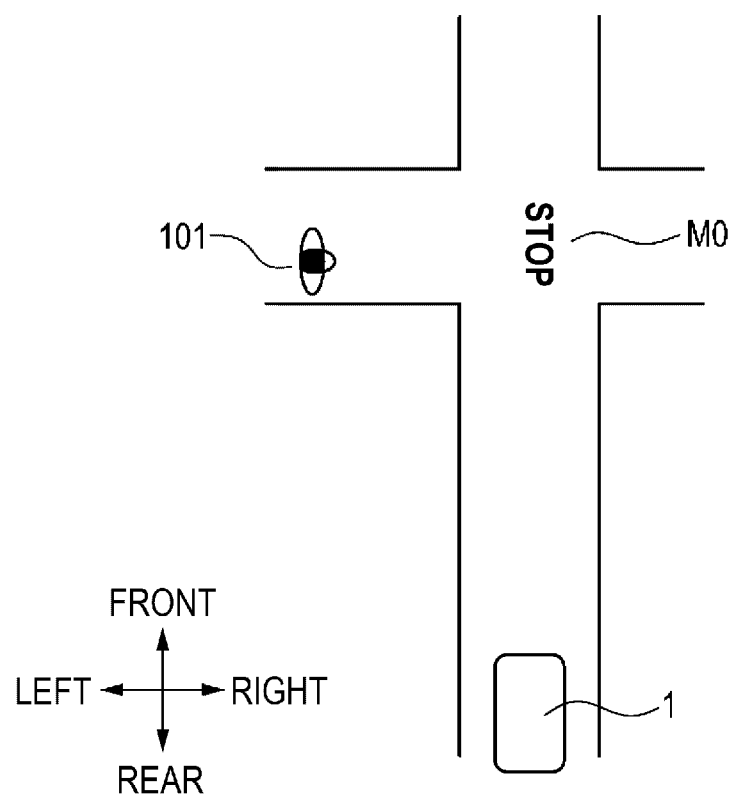
FIG. 4A is a view for explaining an example of road-surface projection according to the first embodiment.
Figure 4B:
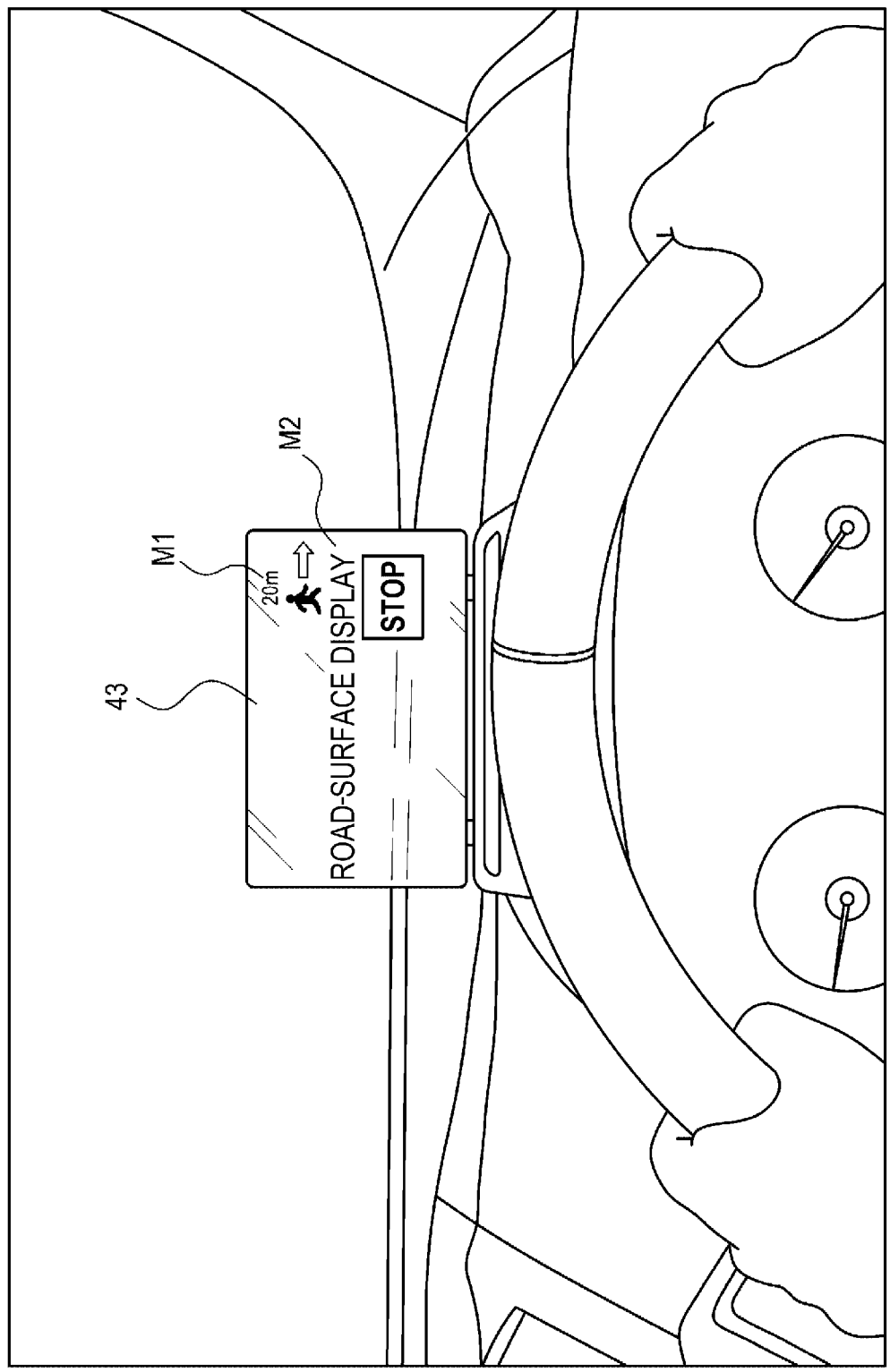
FIG. 4B is a view for explaining an example of a HUD that displays a captured image of a light pattern projected on a road surface according to the first embodiment.

The HUD 43 is installed at a predetermined position inside the vehicle 1. For example, as shown in FIG. 4B, the HUD 43 is installed on a dashboard of the vehicle 1. The position where the HUD 43 is installed is not particularly limited. The HUD 43 functions as a visual interface between the vehicle 1 and the occupant. In particular, the HUD 43 is configured to visually present information on driving of the vehicle 1 (for example, information on the automated driving) and pedestrian information to the occupant. For example, the HUD 43 is configured to display information obtained by inter-vehicle communication between the vehicle 1 and other vehicles and/or road-vehicle communication between the vehicle 1 and infrastructure equipment (a traffic light or the like). In this respect, the HUD 43 is configured to display messages transmitted from other vehicles and/or the infrastructure equipment. The occupant of the vehicle 1 may grasp intentions of other vehicles by looking at the message displayed by the HUD 43. For example, the HUD 43 is configured to display information obtained from the sensor 5 and/or the camera 6. The occupant of the vehicle 1 may grasp the traveling state of the vehicle 1 and/or the pedestrian information by looking at the message displayed by the HUD 43.

The HUD 43 is configured to visually present to the occupant an image of the light pattern projected on the road surface by the road-surface projection device 42 as viewed from above. The occupant of the vehicle 1 may accurately (for example, from a viewpoint of the object) recognize a shape of the light pattern projected toward the object by looking at the image of the light pattern displayed by the HUD 43.

For example, the HUD 43 is configured to display the image obtained by capturing the light pattern with at least one camera 6 (the cameras 6L, 6R in the present embodiment) provided in the vehicle 1. The occupant of the vehicle 1 may recognize the actually displayed shape of the light pattern toward the object by looking at the captured image of the light pattern displayed by the HUD 43.

For example, the HUD 43 is configured to display a computer graphics (CG) image indicating a virtual object in which the light pattern projected by the road-surface projection device 42 is virtually viewed from above. In the following description, the computer graphics (CG) image indicating the virtual object in which the light pattern is virtually viewed from above may be simply referred to as a CG image of the light pattern. The occupant of the vehicle 1 may easily recognize the shape of the light pattern toward the object from the CG image by looking at the CG image of the light pattern displayed by the HUD 43.

The HUD 43 may be configured to display a CG image indicating a virtual object in which the vehicle 1 is virtually viewed from above, and a CG image indicating a virtual object of the object (the pedestrian or other vehicles), together with the captured image or the CG image of the light pattern. The occupant of the vehicle 1 may grasp a positional relationship between the vehicle 1 or the object and the light pattern, and a line of sight of the object with respect to the light pattern. In the following description, the CG image indicating the virtual object in which the vehicle 1 is virtually viewed from above and the CG image indicating the virtual object of the object may be simply referred to as a CG image of the vehicle and a CG image of the object.

The information displayed by the HUD 43 is visually presented to the occupant of the vehicle 1 so as to be superimposed on a real space ahead of the vehicle 1. In this way, the HUD 43 functions as an augmented reality (AR) display.

The HUD 43 includes an image generation unit and a transparent screen on which an image generated by the image generation unit is displayed. When a projection method of the HUD 43 is a laser projector method, the image generation unit includes, for example, a laser light source configured to emit laser light, a light deflection device configured to deflect the laser light emitted from the laser light source, and an optical system member such as a lens. The laser light source is, for example, RGB laser light sources configured to respectively emit red laser light, green laser light, and blue laser light. The light deflection device is, for example, an MEMS mirror. The projection method of the HUD 43 may be a digital light processing (DLP) method or a liquid crystal on silicon (LCOS) method. In this case, an LED is used as a light source instead of laser.

The HUD 43 may not include the transparent screen. In this case, the image generated by the image generation unit may be displayed on a windshield 100 of the vehicle 1.

The display control unit 40 is configured to control driving of the lighting device 41. For example, the display control unit 40 controls the lighting device 41 to emit predetermined light based on information relating to the vehicle 1 or information relating to the surrounding environment of the vehicle 1. The display control unit 40 is configured to control driving of the road-surface projection device 42 and the HUD 43. For example, the display control unit 40 controls the road-surface projection device 42 such that a predetermined light pattern is presented toward the object (other vehicles or the pedestrian) based on the information relating to the vehicle 1 or the information relating to the surrounding environment of the vehicle 1. The display control unit 40 controls the HUD 43 such that predetermined information is presented toward the occupant based on the information relating to the vehicle 1 or the information relating to the surrounding environment of the vehicle 1.

The display control unit 40 includes an electronic control unit (ECU) and is electrically connected to a power supply (not shown). The electronic control unit includes a computer system (for example, a SoC) including one or more processors and one or more memories, and an analog processing circuit including an active element such as a transistor and a passive element. The analog processing circuit includes a lamp drive circuit (for example, an LED driver) configured to control driving of a lamp of the lighting device 41. The analog processing circuit includes a first laser light source control circuit configured to control driving of the laser light source of the road-surface projection device 42, and a first light deflection device control circuit configured to control driving of the light deflection device of the road-surface projection device 42. The analog processing circuit also includes a second laser light source control circuit configured to control driving of the laser light source of the HUD 43, and a second light deflection device control circuit configured to control driving of the light deflection device of the HUD 43. The processor is, for example, a CPU, an MPU, a GPU, and/or a TPU. The memory includes a ROM and a RAM. The computer system may include a non-Neumann type computer such as an ASIC or an FPGA.

For example, the computer system of the display control unit 40 specifies a light pattern to be emitted to the outside of the vehicle 1 based on an instruction signal transmitted from the vehicle control unit 3 and then transmits a signal indicating the specified light pattern to the first laser light source control circuit and the first light deflection device control circuit. The first laser light source control circuit generates a control signal for controlling the driving of the laser light source based on the signal indicating the light pattern and then transmits the generated control signal to the laser light source of the road-surface projection device 42. On the other hand, the first light deflection device control circuit generates a control signal for controlling the driving of the light deflection device based on the signal indicating the light pattern and then transmits the generated control signal to the light deflection device of the road-surface projection device 42. In this way, the display control unit 40 may control the driving of the road-surface projection device 42.

The computer system of the display control unit 40 specifies image information (for example, information of characters and figures) displayed on the HUD 43 based on an instruction signal transmitted from the vehicle control unit 3 and then transmits a signal indicating the specified image information to the second laser light source control circuit and the second light deflection device control circuit. The second laser light source control circuit generates a control signal for controlling the driving of the laser light source based on the signal indicating the image information and then transmits the generated control signal to the laser light source of the HUD 43. On the other hand, the second light deflection device control circuit generates a control signal for controlling the driving of the light deflection device based on the signal indicating the image information and then transmits the generated control signal to the light deflection device of the HUD 43. In this way, the display control unit 40 may control the driving of the HUD 43.

After transmitting the signal indicating the specified light pattern to the first laser light source control circuit and the first light deflection device control circuit, the computer system of the display control unit 40 acquires captured image information of the light pattern captured by the camera 6 from the vehicle control unit 3, and transmits a signal indicating the captured image information of the light pattern to the second laser light source control circuit and the second light deflection device control circuit. The second laser light source control circuit generates a control signal for controlling the driving of the laser light source based on the signal indicating the captured image information of the light pattern and then transmits the generated control signal to the laser light source of the HUD 43. On the other hand, the second light deflection device control circuit generates a control signal for controlling the driving of the light deflection device based on the signal indicating the captured image information of the light pattern and then transmits the generated control signal to the light deflection device of the HUD 43.

Simultaneously with or after transmitting the signal indicating the specified light pattern to the first laser light source control circuit and the first light deflection device control circuit, the computer system of the display control unit 40 acquires CG image information of the light pattern from the memory, and transmits a signal indicating the CG image information of the light pattern to the second laser light source control circuit and the second light deflection device control circuit. The second laser light source control circuit generates a control signal for controlling the driving of the laser light source based on the signal indicating the CG image information of the light pattern and then transmits the generated control signal to the laser light source of the HUD 43. On the other hand, the second light deflection device control circuit generates a control signal for controlling the driving of the light deflection device based on the signal indicating the CG image information of the light pattern and then transmits the generated control signal to the light deflection device of the HUD 43. The CG image information is stored in the storage device 11 instead of the memory of the display control unit 40, and the display control unit 40 may acquire the CG image information via the vehicle control unit 3.

The vehicle 1 may travel in the automated driving mode or a manual driving mode. The vehicle control unit 3 may selectively execute the automated driving mode or the manual driving mode.

In the automated driving mode, the vehicle control unit 3 automatically generates a steering control signal, an accelerator control signal, and a brake control signal according to an output of an external sensor (at least one of the camera 6, the radar 7, the GPS 9, the wireless communication unit 10, and the like) that acquires information outside the vehicle 1. The vehicle control unit 3 automatically generates the steering control signal, the accelerator control signal, and the brake control signal according to the output of the external sensor, regardless of an output of the sensor 5 that detects a displacement of an operator that is user-operable.

For example, in the automated driving mode, the vehicle control unit 3 automatically generates the steering control signal, the accelerator control signal, and the brake control signal based on the surrounding environment information ahead of the vehicle 1 acquired by the camera 6, the current position information of the GPS 9, the map information stored in the storage device 11, and the like. In the automated driving mode, the vehicle 1 is driven independently of the user.

In the manual driving mode, the vehicle control unit 3 normally generates the steering control signal, the accelerator control signal and the brake control signal regardless of the output of the external sensor. That is, in the manual driving mode, the vehicle control unit 3 normally generates the steering control signal based on an operation of the steering wheel by the user, regardless of the output of the external sensor. The vehicle control unit 3 normally generates the accelerator control signal based on an operation of the accelerator pedal by the user regardless of the output of the external sensor. The vehicle control unit 3 generates the brake control signal based on an operation of the brake pedal by the user, regardless of the output of the external sensor. In the manual driving mode, the vehicle 1 is normally driven by the user.

In the manual driving mode, the vehicle control unit 3 may execute anti-lock brake control for controlling the brake control signal according to an output of a wheel speed sensor, which is the sensor 5, for example. In the manual driving mode, the vehicle control unit 3 may execute electric stability control, traction control, or the like for controlling at least one of the steering control signal, the accelerator control signal, and the brake control signal according to an output of a steering angle sensor, the wheel speed sensor, or a yaw rate sensor, which is the sensor 5.

Alternatively, in the manual driving mode, the vehicle control unit 3 may execute pre-crash control or collision avoidance control for generating the steering control signal and the brake control signal according to the output of the external sensor such as the camera 6 in an emergency. In this way, in the manual driving mode, the vehicle control unit 3 may generate at least one of the steering control signal, the accelerator control signal, and the brake control signal according to the output of the external sensor in the emergency.

In the manual driving mode, a trigger that generates the steering control signal, the accelerator control signal, and the brake control signal is normally the displacement of the operator such as the steering wheel, the accelerator pedal, and the brake pedal operated by the user. In the manual driving mode, the vehicle control unit 3 may normally control (process) a signal such as the steering control signal, the accelerator control signal and the brake control signal generated by the displacement of the operator according to the output of the sensor 5 or the external sensor. In the present embodiment, a so-called driver-assistance mode in which driving of the user is assisted according to the output of the sensor 5 or the external sensor is one form of the manual driving mode.

According to a definition of levels 0 to 5 of the automated driving mode currently known in 2018, the automated driving mode of the present embodiment corresponds to levels 3 to 5 (excluding an emergency or the like), and the manual driving mode of the present embodiment corresponds to levels 0 to 2.

Figure 3:
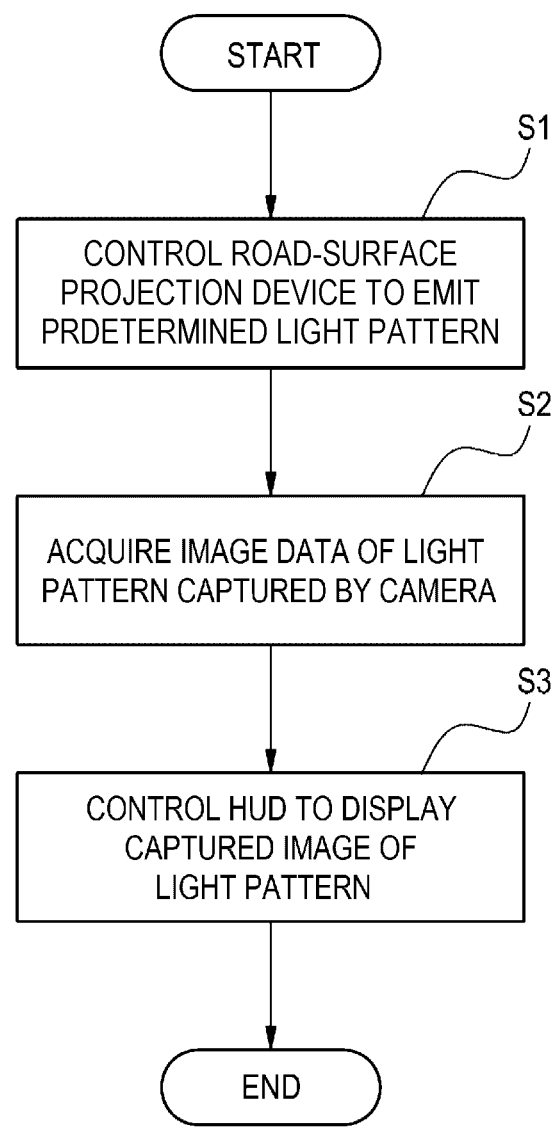
FIG. 3 is a flowchart for explaining an example of display control by a display control unit according to the first embodiment.

Next, an example of display control of the display control unit 40 according to the first embodiment will be described with reference mainly to FIGS. 3 to 4B. FIG. 3 is a flowchart for explaining an example of the display control by the display control unit 40 according to the first embodiment. FIG. 4A is a view for explaining an example of road-surface projection according to the first embodiment. FIG. 4A shows an example of the road surface (including a pedestrian 101, a light pattern M0, and the vehicle 1) as viewed from above. FIG. 4B is a view for explaining an example of a HUD that displays the captured image of the light pattern projected on the road surface according to the first embodiment.

The display control unit 40 according to the first embodiment causes the road-surface projection device 42 to emit the light pattern toward the road surface, and causes the HUD 43 to display the image obtained by capturing the light pattern with the camera 6.

As shown in FIG. 3, in step S1, the display control unit 40 controls the road-surface projection device 42 to emit a predetermined light pattern based on the surrounding environment information and the like acquired from the vehicle control unit 3. Next, in step S2, the display control unit 40 acquires image data obtained by capturing the light pattern projected by the road-surface projection device 42 with the camera 6 from the vehicle control unit 3. In step S3, the display control unit 40 controls the HUD 43 to display the captured image of the light pattern.

For example, as shown in FIG. 4A, the vehicle 1 draws the light pattern M0 by the road-surface projection device 42. The light pattern M0 is a light pattern indicating a message of "stop" projected toward the pedestrian 101 approaching from a front left side. In the present embodiment, as shown in FIG. 4B, the vehicle 1 captures the light pattern M0 by the camera 6, and displays a captured image M2 of the light pattern M0 toward the occupant of the vehicle 1 by the HUD 43. In FIG. 4B, the captured image of the camera 6 is displayed on the HUD 43 in a state of being rotated by 90 degrees in accordance with a direction of the occupant of the vehicle 1. By rotating captured image data of the camera 6 by a predetermined angle in accordance with the direction of the occupant of the vehicle 1 in this way, the light pattern may be confirmed in the same direction as a direction in which the occupant of the vehicle 1 sees an object (the pedestrian 101), and contents of the light pattern may be easily grasped. The captured image of the camera 6 may be displayed on the HUD 43 in a direction as it is.

In FIG. 4B, pedestrian information M1 is displayed on the HUD 43 in addition to the captured image M2 of the light pattern M0. The pedestrian information M1 is a CG image including a combination of a left-pointing arrow indicating a traveling direction of the pedestrian 101, a mark indicating the pedestrian 101, and characters indicating a distance from the own vehicle 1 to the pedestrian 101. In this way, by displaying object (for example, pedestrian) information together in this way, the occupant of the vehicle 1 may grasp a distance to the object, a traveling direction of the object, an attribute of the object (other vehicles or the pedestrian), and the like. A configuration of the pedestrian information M1 is not limited to the configuration shown in FIG. 4B. The pedestrian information M1 may not be displayed on the HUD 43. The pedestrian information M1 is stored in the memory of the display control unit 40 or the storage device 11, and the display control unit 40 causes the HUD 43 to display the object information based on information on a position of the object detected by the camera 6 or the sensor 5 (a LiDAR or the like), and the like. Instead of the pedestrian information, own vehicle information described later may be displayed on the HUD 43.

In this way, the display control unit 40 causes the road-surface projection device 42 to emit the light pattern toward the road surface, and causes the HUD 43 to display the image indicating the light pattern as viewed from above. Therefore, the occupant of the vehicle 1 may recognize a shape of the light pattern toward the object from a viewpoint of the object. In this way, the occupant may accurately recognize visual communication between the vehicle and the object.

The display control unit 40 acquires image data of the light pattern captured by at least one camera 6 from the vehicle control unit 3 as the image indicating the light pattern as viewed from above. Therefore, the occupant of the vehicle 1 may recognize the actually displayed shape of the light pattern toward the object.

The display control unit 40 displays the CG image indicating a virtual object of the object together with the captured image of the light pattern. Therefore, the occupant of the vehicle 1 may grasp the attribute of the object, the traveling direction of the object, the distance to the object, and the like.

Second Embodiment

Figure 5:
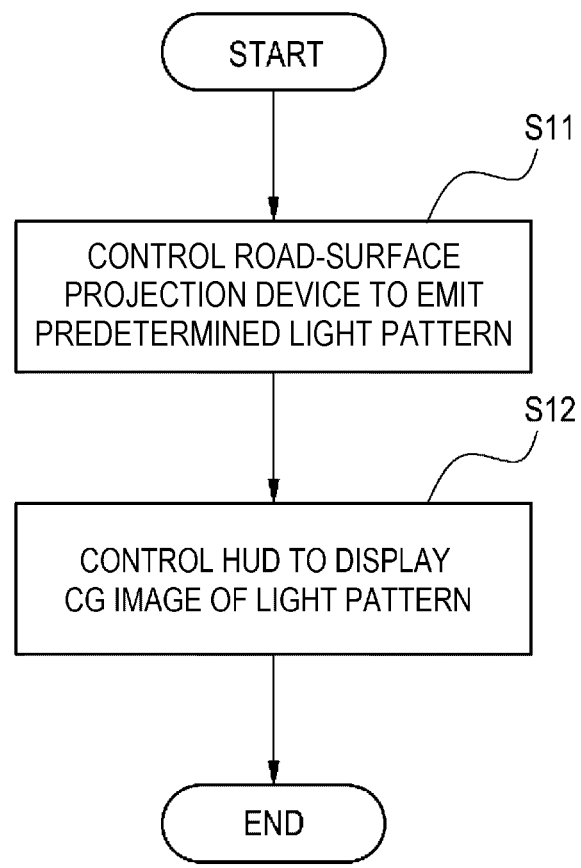
FIG. 5 is a flowchart for explaining an example of display control by a display control unit according to a second embodiment of the present invention.
Figure 6A:
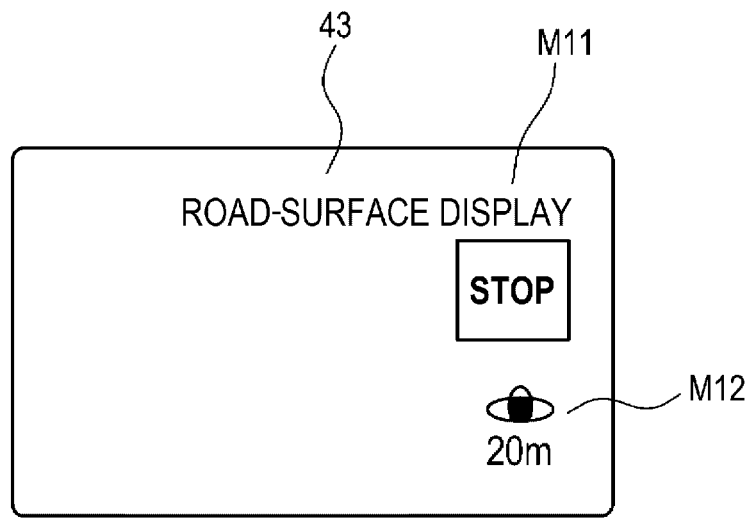
FIG. 6A is a view for explaining an example of a HUD that displays a CG image of a light pattern projected on a road surface according to the second embodiment.
Figure 6B:
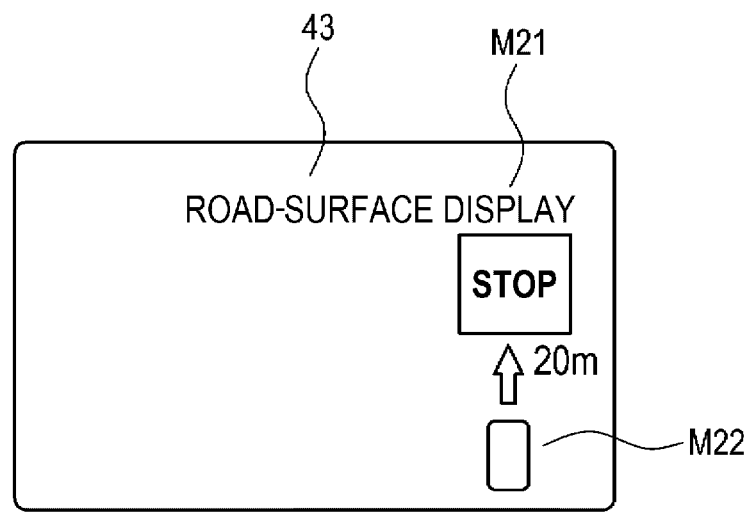
FIG. 6B is a view for explaining another example of the HUD that displays the CG image of the light pattern projected on the road surface according to the second embodiment.

Next, an example of display control of the display control unit 40 according to a second embodiment of the present invention (hereinafter, referred to as the second embodiment) will be described with reference mainly to FIGS. 5 to 6B. FIG. 5 is a flowchart for explaining an example of the display control by the display control unit according to the second embodiment of the present invention. FIG. 6A is a view for explaining an example of a HUD that displays a CG image of a light pattern projected on a road surface according to the second embodiment. FIG. 6B is a view for explaining another example of the HUD that displays the CG image of the light pattern projected on the road surface according to the second embodiment. In the description of the second embodiment, description of members having reference numerals the same as those already described in the description of the first embodiment will be omitted for convenience of description.

The display control unit 40 according to the first embodiment causes the HUD 43 to display an image of the light pattern captured by the camera 6. In contrast, the display control unit 40 according to the second embodiment causes the HUD 43 to display the CG image indicating a virtual object in which the light pattern projected on the road surface is virtually viewed from above. An occupant of the vehicle 1 may select any one of the captured image and the CG image as an image of the light pattern as viewed from above to be displayed on the HUD 43 via the HMI 8. For example, an input unit of the HMI 8 includes a light pattern image selection switch for selecting any one of the captured image and the CG image.

As shown in FIG. 5, in step S11, the display control unit 40 controls the road-surface projection device 42 to emit a predetermined light pattern based on surrounding environment information and the like acquired from the vehicle control unit 3. Next, in step S12, the display control unit 40 controls the HUD 43 to display the CG image indicating the virtual object in which the light pattern projected by the road-surface projection device 42 is virtually viewed from above. The CG image indicating the virtual object in which the light pattern projected by the road-surface projection device 42 is virtually viewed from above is stored in a memory of the display control unit 40 or the storage device 11. The display control unit 40 acquires the CG image of the light pattern projected by the road-surface projection device 42 from the memory or the storage device 11 and causes the HUD 43 to display the CG image.

For example, as shown in FIG. 4A, the vehicle 1 draws the light pattern M0 by the road-surface projection device 42. The light pattern M0 is a light pattern indicating a message of "stop" projected toward the pedestrian 101 approaching from a front left side. In the present embodiment, as shown in FIG. 6A, the vehicle 1 acquires a CG image M11 of the light pattern M0 from the memory of the display control unit 40 or the storage device 11, and displays the CG image M11 of the light pattern M0 toward the occupant of the vehicle 1 by the HUD 43. Although an orientation of the CG image M11 is adjusted and displayed in accordance with a direction of the occupant of the vehicle 1 in FIG. 6A, the present invention is not limited thereto. In FIG. 6A, pedestrian information M12 is displayed on the HUD 43 in addition to the CG image M11 of the light pattern M0. The pedestrian information M12 includes a CG image indicating a virtual object in which the pedestrian 101 is virtually viewed from above and a CG image of characters indicating a distance from the own vehicle 1 to the pedestrian 101. The CG image of the pedestrian 101 shows a state in which the pedestrian is facing the light pattern of the CG image M11. By displaying object (pedestrian) information together in this way, the occupant of the vehicle 1 may grasp a distance to an object, a positional relationship between the object and the light pattern, an attribute of the object (other vehicles or the pedestrian), a line of sight of the object with respect to the light pattern, and the like. A configuration of the pedestrian information M12 is not limited to the configuration shown in FIG. 6A. The pedestrian information M12 may not be displayed on the HUD 43. For example, as shown in FIG. 6B, own vehicle information M22 may be displayed together with the CG image M21 of the light pattern M0. The own vehicle information M22 includes a CG image indicating a virtual object in which the own vehicle 1 is virtually viewed from above, and a CG image of characters and an arrow indicating a distance and a direction from the own vehicle 1 to the light pattern M0. The own vehicle information M22 is not limited to the configuration shown in FIG. 6B. The pedestrian information M12 and the own vehicle information M22 are stored in the memory of the display control unit 40 or the storage device 11, and the display control unit 40 causes HUD 43 to display the pedestrian information and the own vehicle information based on information on a position of the object or the light pattern detected by the camera 6 or the sensor 5 (a LiDAR or the like), and the like.

In this way, the display control unit 40 causes the road-surface projection device 42 to emit the light pattern toward the road surface, and causes the HUD 43 to display the image indicating the light pattern as viewed from above. Therefore, the occupant of the vehicle 1 may recognize a shape of the light pattern toward the object from a viewpoint of the object. In this way, the occupant may accurately recognize visual communication between the vehicle and the object.

The display control unit 40 acquires the CG image indicating the virtual object in which the light pattern is virtually viewed from above from the memory or the storage device 11 as the image indicating the light pattern as viewed from above. Therefore, the occupant of the vehicle 1 may easily recognize the shape of the light pattern toward the object from the CG image.

The display control unit 40 displays the CG image indicating the virtual object of the vehicle 1 or the object together with the CG image of the light pattern. Therefore, the occupant of the vehicle 1 may grasp the distance to the object or the light pattern, and the like.

Third Embodiment

Figure 7A:
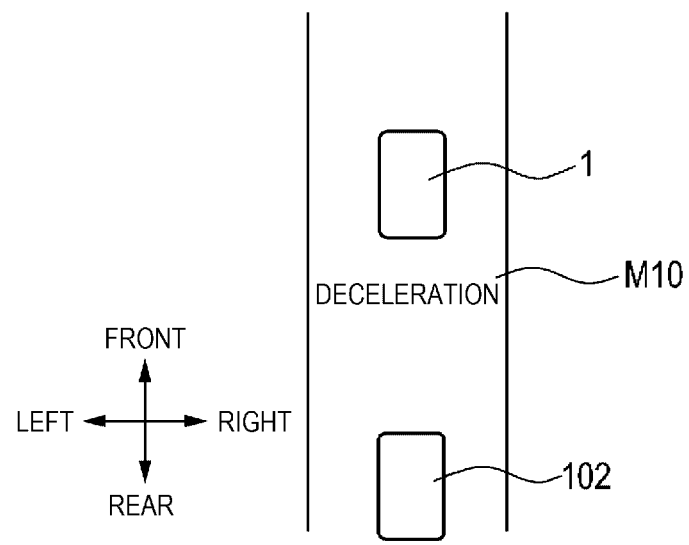
FIG. 7A is a view for explaining an example of road-surface projection according to a third embodiment of the present invention.
Figure 7B:
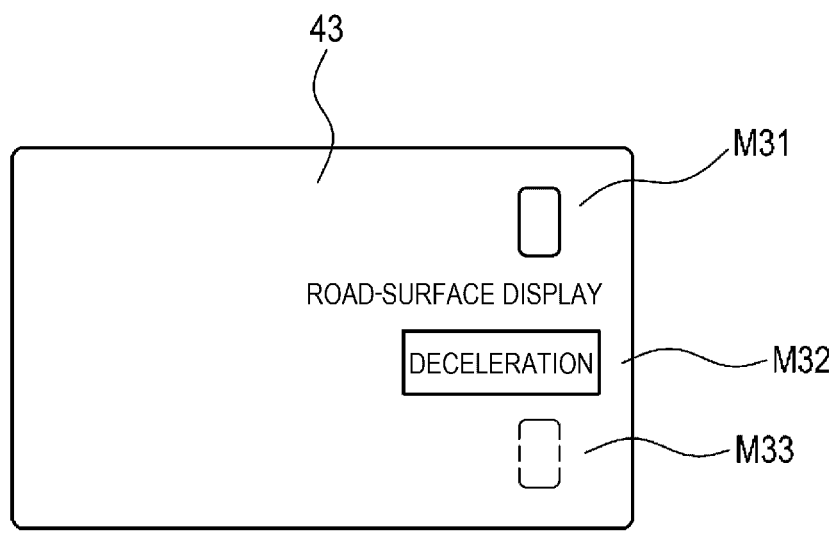
FIG. 7B is a view for explaining an example of a HUD that displays a captured image of a light pattern projected on a road surface according to the third embodiment.

Next, an example of display control of the display control unit 40 according to a third embodiment of the present invention (hereinafter, referred to as the third embodiment) will be described with reference mainly to FIGS. 7A and 7B. FIG. 7A is a view for explaining an example of road-surface projection according to the third embodiment. FIG. 7A shows an example of a road surface (including the vehicle 1, a light pattern M10, and a following vehicle 102) as viewed from above. FIG. 7B is a view for explaining an example of a HUD that displays a captured image of a light pattern projected on the road surface according to the third embodiment. In the description of the third embodiment, description of members having the same reference numerals as those already described in the description of the first or second embodiments will be omitted for convenience of description. Since a display control flow of the display control unit 40 is the same as that of the first embodiment, description thereof will be omitted.

The display control unit 40 according to the first and second embodiments causes the HUD 43 to display the captured image or a CG image of the light pattern emitted toward the road surface ahead of the vehicle 1 by the road-surface projection device 42 disposed on a front side of the vehicle 1. In contrast, the display control unit 40 according to the third embodiment causes the HUD 43 to display the captured image of the light pattern emitted toward the road-surface behind the vehicle 1.

For example, as shown in FIG. 7A, the vehicle 1 draws the light pattern M10 by the road-surface projection device 42. The light pattern M10 is a light pattern indicating a message of "deceleration" projected toward the following vehicle 102. In the present embodiment, as shown in FIG. 7B, the vehicle 1 captures the light pattern M10 by the camera 6, and displays a captured image M32 of the light pattern M10 toward the occupant of the vehicle 1 by the HUD 43. In addition to the captured image M32 of the light pattern M10, a CG image M31 of the own vehicle 1 and a CG image M33 of the following vehicle 102 are displayed on the HUD 43 as own vehicle information and object information. The CG image M31 of the own vehicle 1 and the CG image M33 of the following vehicle 102 are CG images indicating virtual objects as respectively viewed from above. In this way, by displaying the CG images of the own vehicle 1 and the following vehicle 102 together, the occupant of the vehicle 1 may grasp a positional relationship between the own vehicle 1 or the following vehicle 102 and the light pattern. The own vehicle information and the object information are not limited to the configuration shown in FIG. 7B. The own vehicle information and the object information may not be displayed. The object information and the own vehicle information are stored in a memory of the display control unit 40 or the storage device 11, and the display control unit 40 causes the HUD 43 to display the object information and the own vehicle information based on information on a position of an object or the light pattern detected by the camera 6 or the sensor 5 (a LiDAR or the like), and the like.

In the third embodiment, the captured image of the light pattern captured by the camera 6 is displayed on the HUD 43 as the image indicating the light pattern as viewed from above, but the CG image of the light pattern may be displayed as in the second embodiment.

Fourth Embodiment

Figure 8A:
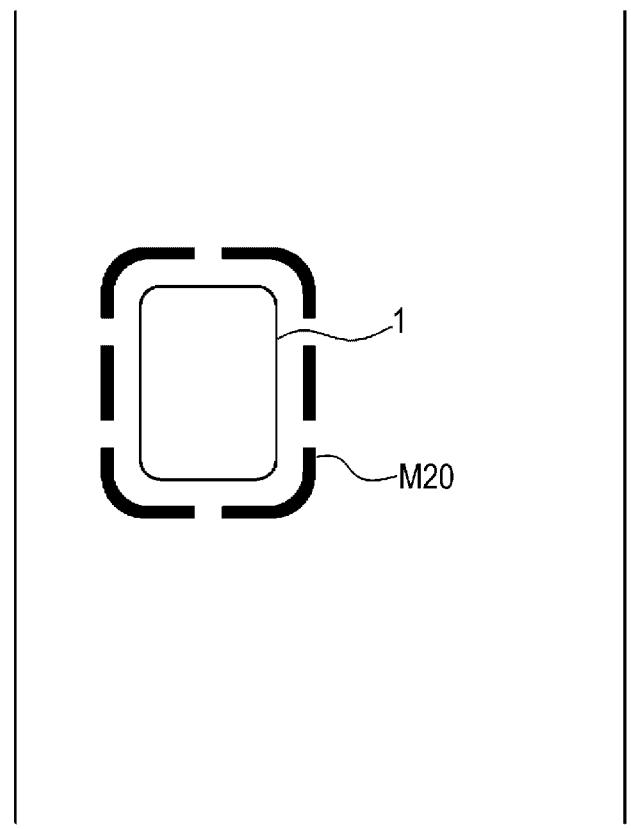
FIG. 8A is a view for explaining an example of road-surface projection according to a fourth embodiment of the present invention.
Figure 8B:
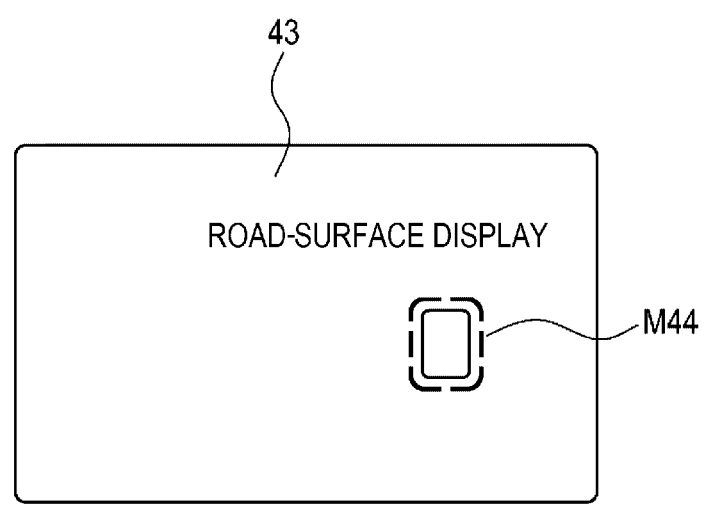
FIG. 8B is a view for explaining an example of a HUD that displays a CG image of a light pattern projected on a road surface according to the fourth embodiment.

Next, an example of display control of the display control unit 40 according to a fourth embodiment of the present invention (hereinafter, referred to as the fourth embodiment) will be described with reference mainly to FIGS. 8A and 8B. FIG. 8A is a view for explaining an example of road-surface projection according to the fourth embodiment. FIG. 8A shows an example of a road surface (including the vehicle 1 and a light pattern M20) as viewed from above. FIG. 8B is a view for explaining an example of a HUD that displays a CG image of a light pattern projected on a road surface according to the fourth embodiment. In the description of the fourth embodiment, description of members having the same reference numerals as those already described in the description of the first to third embodiments will be omitted for convenience of description. Since a display control flow of the display control unit 40 is the same as that of the second embodiment, description thereof will be omitted.

The display control unit 40 according to the first to third embodiments causes the HUD 43 to display a captured image or a CG image of the light pattern emitted toward the road surface ahead or behind the vehicle 1. In contrast, the display control unit 40 according to the fourth embodiment causes the HUD 43 to display the CG image of the light pattern emitted toward the road surface in vicinity of the vehicle 1.

For example, as shown in FIG. 8A, the vehicle 1 draws the light pattern M20 by the road-surface projection device 42. The light pattern M20 is projected toward a periphery of the vehicle 102. For example, the light pattern M20 is a light pattern for informing surroundings of a message of being temporarily stopping. In the fourth embodiment, as shown in FIG. 8B, the vehicle 1 acquires a CG image M44 of the light pattern M20 from a memory of the display control unit 40 or the storage device 11, and displays the CG image M44 of the light pattern M20 toward an occupant of the vehicle 1 by the HUD 43. In FIG. 8B, a CG image indicating a virtual object in which the own vehicle 1 is virtually viewed from above is displayed together with the CG image M44 of the light pattern M20. In this way, by displaying own vehicle information together, the occupant of the vehicle 1 may grasp a positional relationship between the own vehicle and the light pattern.

In the fourth embodiment, the CG image of the light pattern is displayed on the HUD 43 as the image indicating the light pattern as viewed from above, but the captured image of the light pattern captured by the plurality of cameras 6 disposed around the vehicle may be displayed together with the CG image of the own vehicle 1.

Fifth Embodiment

Figure 9:
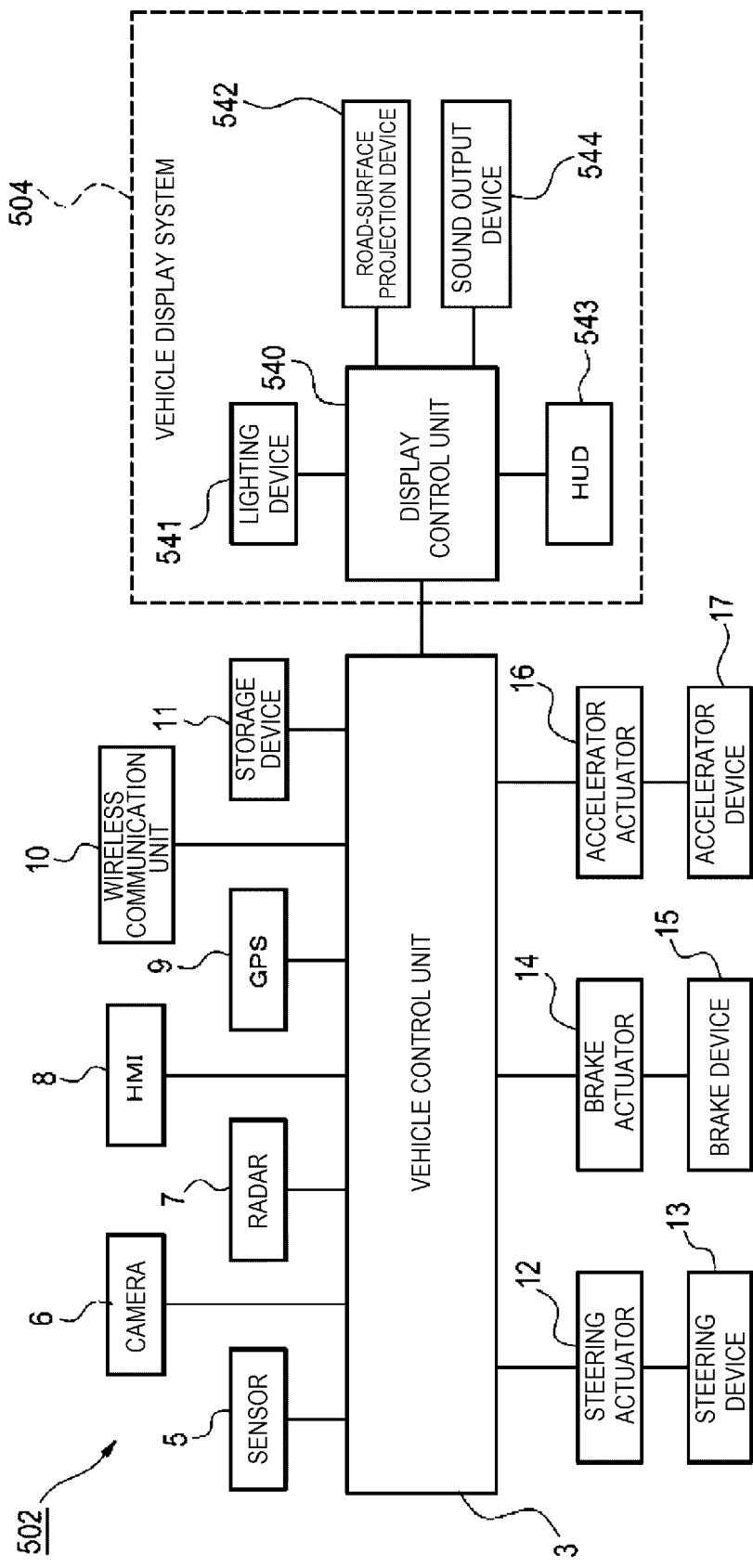
FIG. 9 is a block diagram of a vehicle system according to a fifth embodiment of the present invention.

Next, an example of a vehicle system 502 according to a fifth embodiment of the present invention (hereinafter, referred to as the fifth embodiment) will be described with reference to FIG. 9. FIG. 9 is a block diagram of the vehicle system 502 according to the fifth embodiment. In the description of the fifth embodiment, the same members as those already described in the description of the first embodiment are denoted by the same reference numerals, and description thereof will be omitted for convenience of description.

As shown in FIG. 9, the vehicle system 502 according to the fifth embodiment includes the vehicle control unit 3, a vehicle display system 504 (hereinafter, simply referred to as a "display system 504"), the sensor 5, the camera 6, and the radar 7. The vehicle system 502 further includes the HMI 8, the GPS 9, the wireless communication unit 10, and the storage device 11. The vehicle system 502 further includes the steering actuator 12, the steering device 13, the brake actuator 14, the brake device 15, the accelerator actuator 16, and the accelerator device 17.

The display system 504 according to the fifth embodiment includes a display control unit 540, a lighting device 541, a road-surface projection device 542, a head-up display (HUD) 543, and a sound output device 544. The display control unit 540 is an example of a determination unit. The road-surface projection device 542 is an example of a first display device. The HUD 543 is an example of an output unit and a second display device. The sound output device 544 is an example of an output unit.

The lighting device 541 is configured to emit light toward outside of a vehicle. The lighting device 541 may include, for example, a headlamp or a position lamp provided at a front portion of the vehicle, a rear combination lamp provided at a rear portion of the vehicle, turn signal lamps provided at the front portion or side portions of the vehicle, and various lamps that inform a pedestrian or drivers of other vehicles of a situation of the own vehicle.

The road-surface projection device 542 is configured to emit a light pattern toward a road surface outside the vehicle. The road-surface projection device 542 includes, for example, a laser light source configured to emit laser light, a light deflection device configured to deflect the laser light emitted from the laser light source, and an optical system member such as a lens. The road-surface projection device 542 is configured to draw light patterns M30 to M60 (see FIGS. 11A to 11D) on the road surface by scanning with the laser light.

The number, arrangement positions, and shapes of the road-surface projection devices 542 are not particularly limited as long as the road-surface projection device 542 may draw the light pattern on the road surface.

Figure 12A:
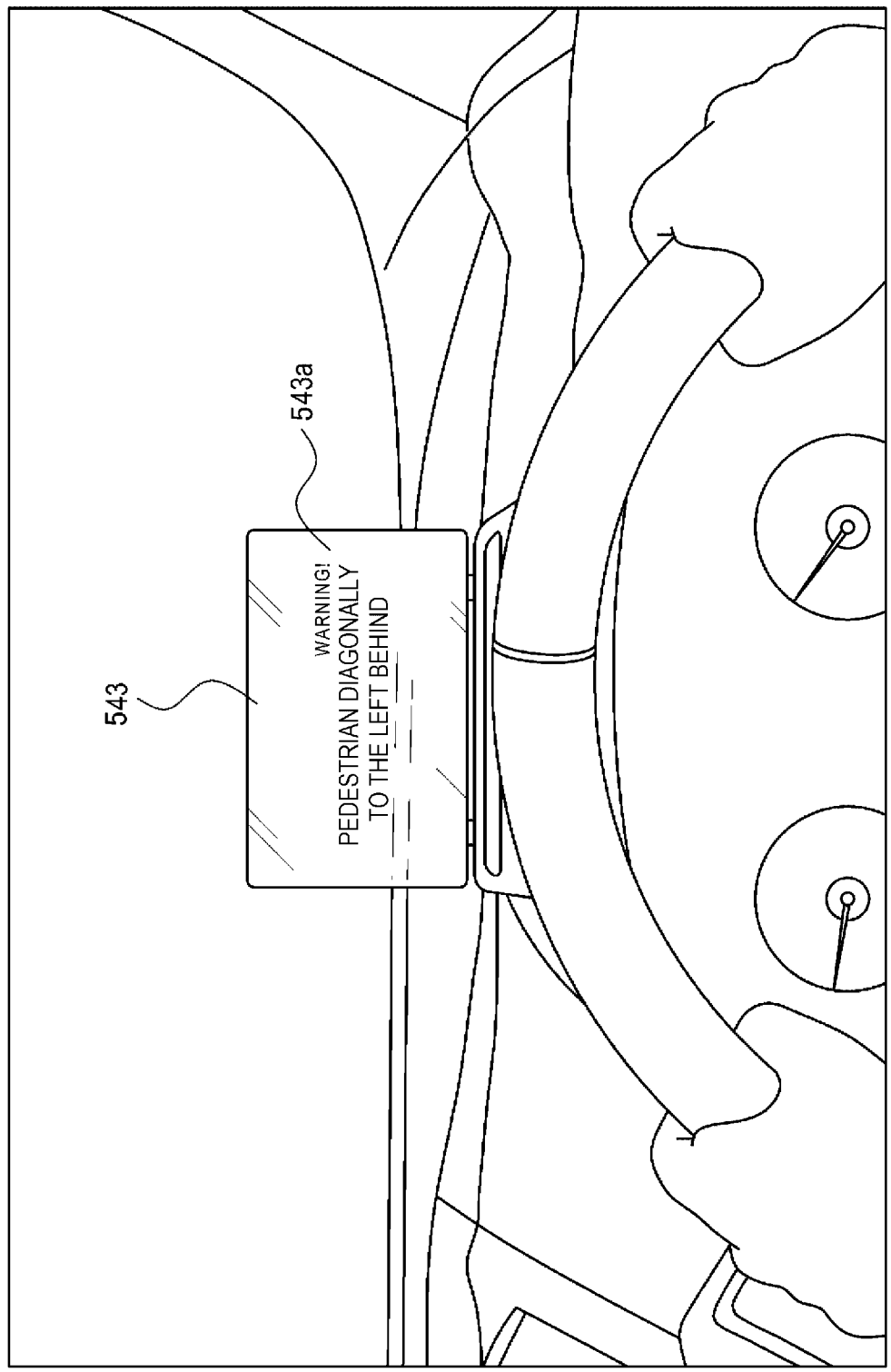
FIG. 12A is a view for explaining an example of a message displayed on a HUD according to the fifth embodiment.

The HUD 543 is installed at a predetermined position inside the vehicle. For example, as shown in FIG. 12A, the HUD 543 is installed on a dashboard of the vehicle. The position where the HUD 543 is installed is not particularly limited. The HUD 543 functions as a visual interface between the vehicle and an occupant. In particular, the HUD 543 is configured to visually present information on driving of the vehicle (for example, information on automated driving) and pedestrian information to the occupant. For example, the HUD 543 is configured to display information obtained by inter-vehicle communication between the vehicle and other vehicles and/or road-vehicle communication between the vehicle and infrastructure equipment (a traffic light or the like). For example, the HUD 543 is configured to display information obtained from the sensor 5 and/or the camera 6.

The HUD 543 is configured to output a predetermined message toward the occupant of the vehicle when it is determined that the light pattern is changed due to an object (the pedestrian, other vehicles, or the like) based on an image obtained by capturing the light pattern emitted by the road-surface projection device 542. The occupant of the vehicle may confirm presence of the object by looking at the predetermined message displayed by the HUD 543.

The information displayed by the HUD 543 is visually presented to the occupant of the vehicle so as to be superimposed on a real space ahead of the vehicle. In this way, the HUD 543 functions as an AR display.

The HUD 543 includes an image generation unit and a transparent screen on which an image generated by the image generation unit is displayed. When a projection method of the HUD 543 is a laser projector method, the image generation unit includes, for example, a laser light source configured to emit laser light, a light deflection device configured to deflect the laser light emitted from the laser light source, and an optical system member such as a lens.

The HUD 543 may display the image generated by the image generation unit on a windshield of the vehicle instead of the transparent screen.

Similarly to the display control unit 40 according to the first embodiment, the display control unit 540 is configured to control driving of the lighting device 541 and driving of the road-surface projection device 542 and the HUD 543. The display control unit 540 includes an electronic control unit (ECU), and is electrically connected to a power supply (not shown). The electronic control unit includes a computer system (for example, a SoC) including one or more processors and one or more memories, and an analog processing circuit including an active element such as a transistor and a passive element.

For example, the computer system of the display control unit 540 acquires captured image information of the light pattern captured by the camera 6 from the vehicle control unit 3 and determines whether the light pattern is changed due to the object based on the captured image information of the light pattern. For example, when it is determined that a shape of the light pattern of the captured image is different from a shape of a reference light pattern, the display control unit 540 determines that the light pattern is changed due to the object. When it is determined that the light pattern is changed due to the object, the computer system of the display control unit 540 specifies image information (for example, character or graphic information) of the predetermined message displayed on the HUD 543 and then transmits a signal indicating the specified image information to a laser light source control circuit and a light deflection device control circuit, which are analog processing circuits. The laser light source control circuit generates a control signal for controlling driving of the laser light source based on the signal indicating the image information and then transmits the generated control signal to the laser light source of the HUD 543. On the other hand, the light deflection device control circuit generates a control signal for controlling driving of the light deflection device based on the signal indicating the image information and then transmits the generated control signal to the light deflection device of the HUD 543. The computer system of the display control unit 540 may determine whether the light pattern is changed due to the object based on information on the vehicle in addition to the captured image information of the light pattern. The computer system of the display control unit 540 may calculate and compare ratios of change of the light pattern of the captured image before and after an elapse of a predetermined time to the reference pattern, and update the predetermined message displayed on the HUD 543 based on a comparison result.

Figure 10:
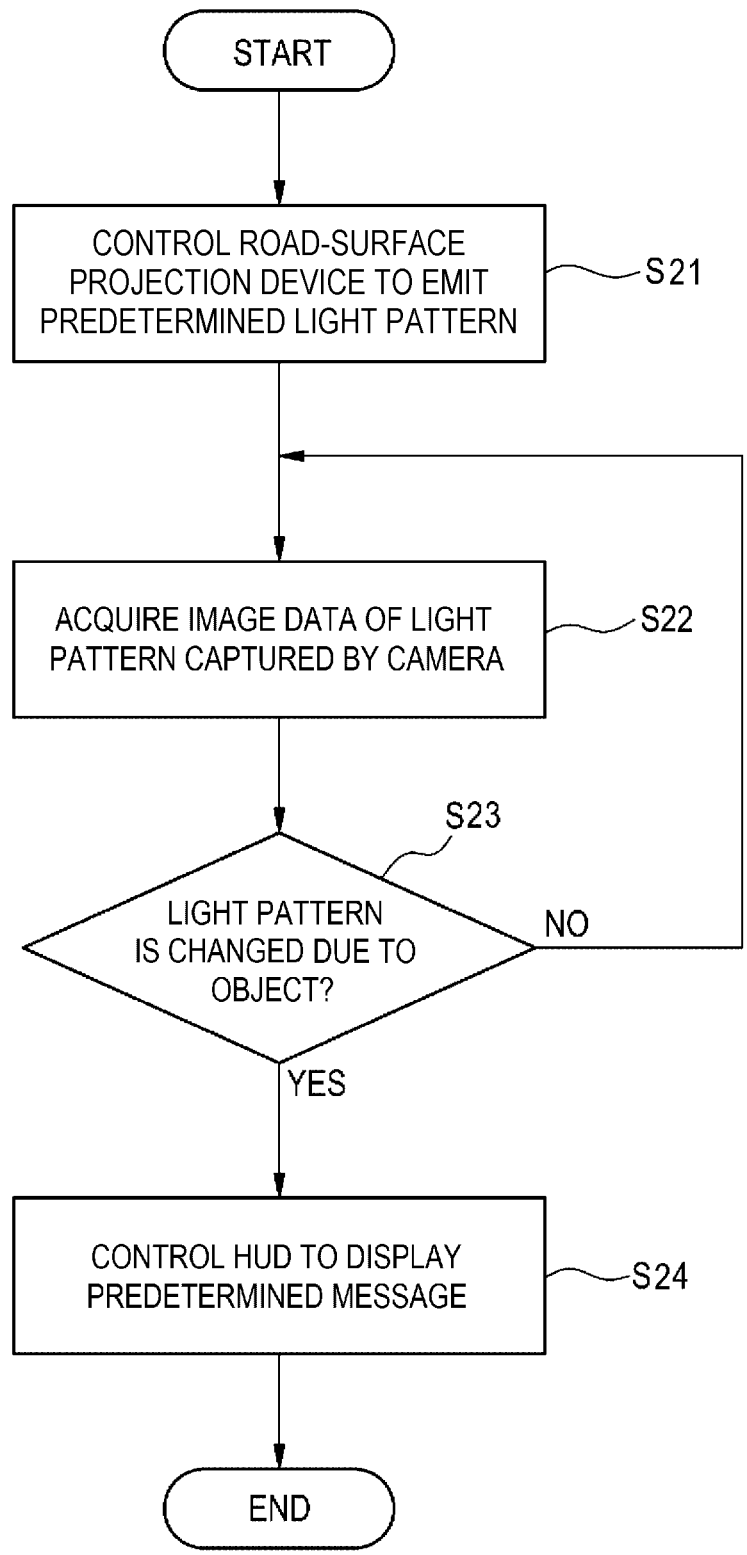
FIG. 10 is a flowchart for explaining an example of display control by a display control unit according to the fifth embodiment.
Figure 11A:
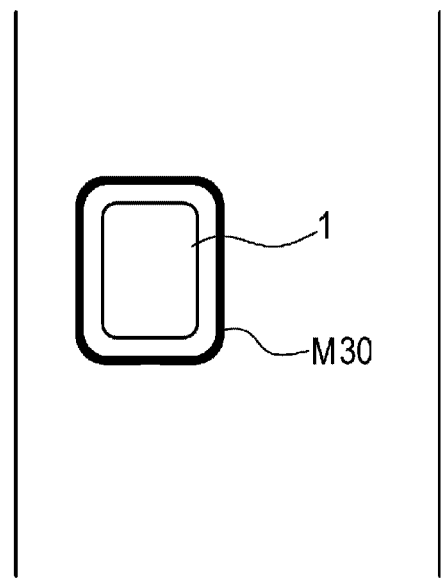
FIG. 11A is a view for explaining an example of road-surface projection according to the fifth embodiment.
Figure 11B:
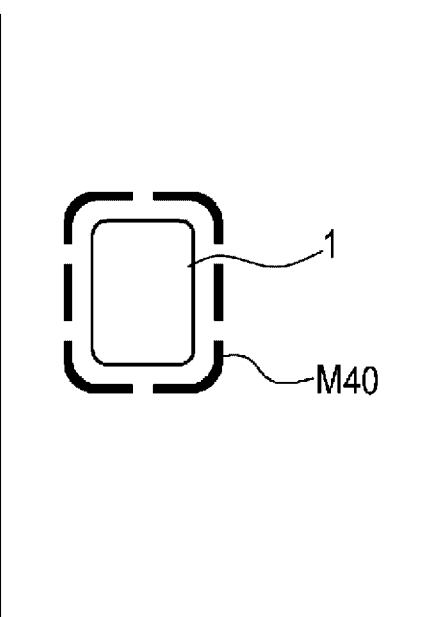
FIG. 11B is a view for explaining an example of the road-surface projection according to the fifth embodiment.
Figure 11C:
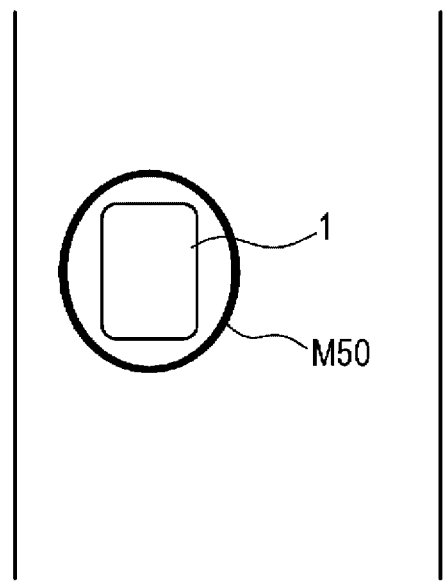
FIG. 11C is a view for explaining an example of the road-surface projection according to the fifth embodiment.
Figure 11D:
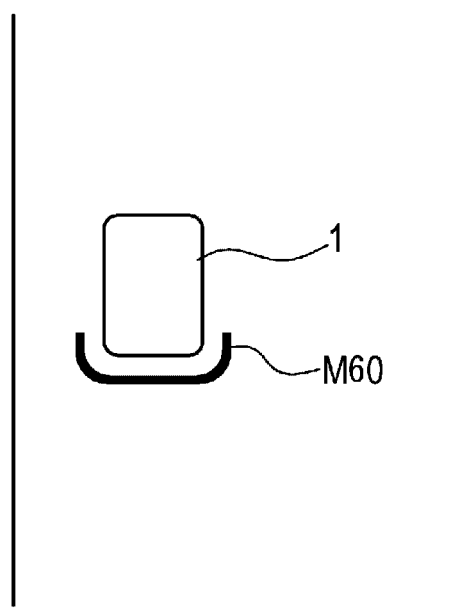
FIG. 11D is a view for explaining an example of the road-surface projection according to the fifth embodiment.
Figure 12B:
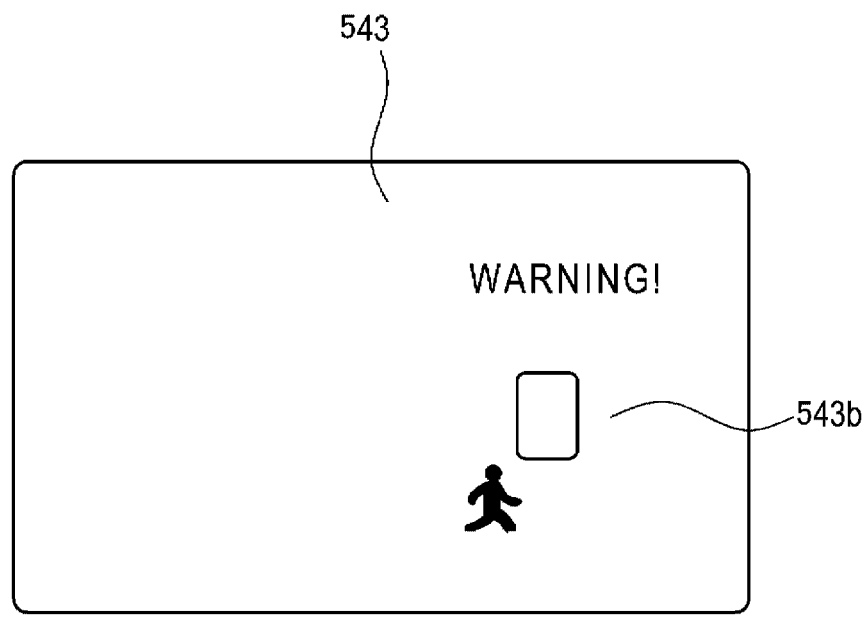
FIG. 12B is a view for explaining an example of the message displayed on the HUD according to the fifth embodiment.

Next, an example of display control of the display control unit 540 according to the fifth embodiment will be described with reference mainly to FIGS. 10 to 12B. FIG. 10 is a flowchart for explaining an example of display control by the display control unit 540 according to the fifth embodiment of the present invention. FIGS. 11A to 11D are views for explaining examples of road-surface projection according to the fifth embodiment. FIGS. 11A to 11D show the vehicle 1 and the light patterns M30, M40, M50, and M60 projected on the road surface as viewed from above. FIGS. 12A and 12B are views for explaining examples of a message displayed on the HUD according to the fifth embodiment.

The display control unit 540 according to the fifth embodiment determines whether the light pattern is changed due to the object (the pedestrian, other vehicles, or the like) based on the image obtained by capturing the light pattern emitted by the road-surface projection device 542 with the camera 6. Then, the display control unit 540 causes the HUD 543 to display the predetermined message according to a determination result.

As shown in FIG. 10, in step S21, the display control unit 540 controls the road-surface projection device 542 to emit a predetermined light pattern toward the road surface based on surrounding environment information and the like acquired from the vehicle control unit 3. FIGS. 11A to 11D show examples of light patterns emitted toward the road surface around the vehicle 1. For example, FIG. 11A shows the light pattern M30 that continuously surrounds the entire vehicle 1. A light pattern surrounding the entire vehicle 1, may be the light pattern M40 surrounding the entire vehicle 1 as shown in FIG. 11B or the light pattern M50 surrounding the entire vehicle 1 as shown in FIG. 11C. The light patterns surrounding the entire vehicle 1 are used to inform surroundings of a message of being temporarily stopping or being starting, for example. The light pattern emitted toward the road surface around the vehicle 1 is not limited to the light patterns surrounding the entire vehicle 1 as shown in FIGS. 11A to 11C. For example, as shown in FIG. 11D, the light pattern M60 projected in a region behind the vehicle 1 may be used. The light pattern projected in the region behind the vehicle 1 is used to inform the surroundings of a backing message, for example. The light pattern projected on the road surface is not limited to these examples.

Next, in step S22, the display control unit 540 acquires image data obtained by capturing the light pattern projected on the road surface with the camera 6 from the vehicle control unit 3.

Next, in step S23, the display control unit 540 determines whether the light pattern is changed due to the object (the pedestrian, other vehicles or the like) based on the image data obtained by capturing with the camera 6. For example, in a case where the light pattern is emitted toward the road surface around the vehicle, when the pedestrian approaches the vehicle, at least a part of the light pattern is blocked by at least part of a body of the pedestrian. A part of the light pattern emitted onto the road surface falls on the body of the pedestrian. As a result, the shape of the light pattern of the captured image obtained by capturing with the camera 6 is changed before and after the light pattern is blocked by the pedestrian. The display control unit 540 acquires the reference light pattern from the memory and compares the shape of the light pattern of the captured image captured by the camera 6 with the shape of the reference light pattern. When it is determined that the shape of the light pattern of the captured image captured by the camera 6 is different from the shape of the reference light pattern, the display control unit 540 determines that the light pattern is changed due to the object. The reference light pattern may be stored in the storage device 11 instead of the memory of the display control unit 540, and the display control unit 540 may acquire the reference light pattern via the vehicle control unit 3.

The reference light pattern may be, for example, a light pattern of a captured image obtained by emitting light patterns onto a test road surface and capturing the light pattern before shipment of the vehicle. When a new light pattern is emitted, the first captured image of the light pattern may be used as the reference light pattern. Each time capturing is performed by the camera 6, a light pattern of a captured image may be stored in the memory, and the light pattern of the captured image obtained immediately before the capturing may be used as the reference light pattern.

When it is determined in step S23 that the light pattern is changed due to the object (YES in step S23), in step S24, the display control unit 540 controls the HUD 543 to display the predetermined message. When it is determined in step S23 that the light pattern is not changed due to the object (NO in step S23), the display control unit 540 returns to control of step S22.

For example, as shown in FIG. 12A, the message displayed in step S24 includes a CG image of characters indicating warning (WARNING!) and a CG image of characters indicating an attribute and a position of the object as object information (pedestrian diagonally to the left behind). The message displayed on the HUD 543 is not limited to the configuration of a message 543a shown in FIG. 12A. For example, as shown in FIG. 12B, the message may be configured as a message 543b including a CG image indicating the own vehicle and the attribute and the position of the object as the object information. The message may only indicate that the object is present in an area irradiated with the light pattern.

The message may be displayed on the HUD 543 until the predetermined time has elapsed. The message may be hidden by an operation of the occupant by an input unit or the like of the HMI 8. The message may be displayed, as acquisition of the image data captured by the camera and determination of a change in the light pattern are continued, until the change in the light pattern due to the object disappears (until the object blocking the light pattern moves away, and the like).

In this way, the display control unit 540 determines whether the light pattern is changed due to the object based on the image obtained by capturing the light pattern emitted by the road-surface projection device 542 with the camera 6. Then, the display control unit 540 controls the HUD 543 to display the predetermined message toward the occupant of the vehicle according to the determination result. Thereby, for example, when the light pattern is changed due to presence of the object, the occupant may be notified of the presence of the object.

When the light pattern is emitted toward the road surface around the vehicle, the occupant may recognize the object present around the vehicle by the change in the light pattern. For example, in a case of the light pattern surrounding a periphery of the vehicle as shown in FIGS. 11A to 11C, the occupant may recognize that the object is present at a position where the change in the light pattern occurs. As shown in FIG. 11D, in a case of the light pattern emitted to the region behind the vehicle, the object present in the region behind the vehicle outside a field of view of the occupant may be recognized.

Sixth Embodiment

Figure 13:
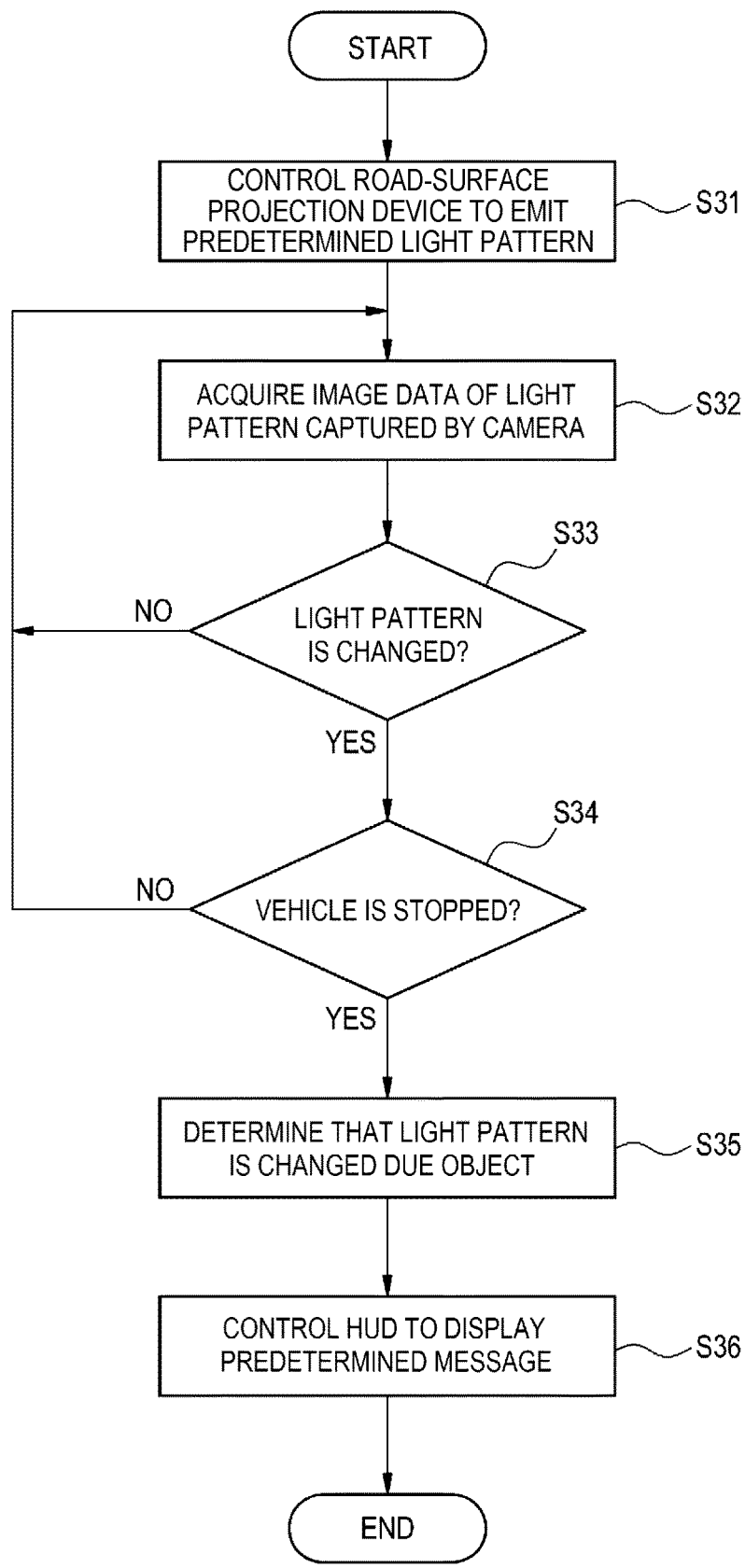
FIG. 13 is a flowchart for explaining an example of display control by a display control unit according to a sixth embodiment of the present invention.

Next, an example of display control of the display control unit 540 according to a sixth embodiment of the present invention (hereinafter, referred to as the sixth embodiment) will be described with reference mainly to FIG. 13. FIG. 13 is a flowchart for explaining the example of the display control by the display control unit according to the sixth embodiment. In the description of the sixth embodiment, description of members having reference numerals the same as those already described in the description of the fifth embodiment will be omitted for convenience of description.

The display control unit 540 according to the fifth embodiment compares a light pattern of a captured image obtained by capturing the light pattern emitted by the road-surface projection device 542 with the camera 6 with a reference light pattern, and determines whether the light pattern is changed due to an object based on a comparison result. In contrast, when it is determined based on the comparison result that the light pattern of the captured image obtained by capturing with the camera 6 is different from the reference light pattern, the display control unit 540 according to the sixth embodiment determines whether it is due to an object (a pedestrian, other vehicles, or the like) or due to other causes based on information on a vehicle. Then, the display control unit 540 determines whether the light pattern is changed due to the object based on a determination result.

The information on the vehicle includes traveling information of the vehicle and surrounding environment information of the vehicle. The other causes refer to, for example, a shape (unevenness or the like) of a road.

The present embodiment describes a case where when it is determined that the light pattern of the captured image obtained by capturing with the camera 6 is different from the reference light pattern and that the vehicle is stopped, the display control unit 540 determines that the light pattern is changed due to the object.

As shown in FIG. 13, in step S31, the display control unit 540 controls the road-surface projection device 542 to emit a predetermined light pattern toward a road surface based on the surrounding environment information and the like acquired from the vehicle control unit 3. For example, the light pattern as shown in FIGS. 11A to 11D is projected on the road surface.

Next, in step S32, the display control unit 540 acquires image data obtained by capturing the light pattern projected on the road surface with the camera 6 from the vehicle control unit 3.

Next, in step S33, the display control unit 540 determines whether the light pattern is changed based on the image data obtained by capturing with the camera 6. For example, the display control unit 540 acquires the reference light pattern from a memory, and compares a shape of the light pattern of the captured image captured by the camera 6 with a shape of the reference light pattern. When it is determined that the shape of the light pattern of the captured image captured by the camera 6 is different from the shape of the reference light pattern, the display control unit 540 determines that the light pattern is changed.

When it is determined in step S33 that the light pattern is changed (YES in step S33), in step S34, the display control unit 540 determines whether the vehicle is stopped. For example, the display control unit 540 obtains the information on the vehicle from the vehicle control unit 3, and determines whether the vehicle is stopped when the light pattern is changed. In a case where the vehicle is stopped when the light pattern is changed, in step S35, the display control unit 540 determines that the light pattern is changed due the object. In step S36, the display control unit 540 controls the HUD 543 to display a predetermined message as shown in FIGS. 12A and 12B.

When it is determined in step S33 that the light pattern is not changed (NO in step S33), the display control unit 540 returns to control of step S32. When it is determined in step S34 that the vehicle is not stopped (NO in step S34), the display control unit 540 determines that the light pattern is changed not due to the object but due to other causes, for example, the shape of the road, and returns to the control of step S32.

In this way, the display control unit 540 determines whether the light pattern is changed due to the object based on the image obtained by capturing the light pattern emitted by the road-surface projection device 542 with the camera 6 and the information on the vehicle. The light pattern projected on the road surface is changed not only due to the object but also due to the shape of the road or the like. This makes it possible to more accurately determine whether the light pattern is changed due to the object.

In the present embodiment, it is determined in step S34 whether the light pattern is changed due to the object depending on whether the vehicle is stopped, but the present invention is not limited thereto. For example, even during traveling, it is possible to obtain the surrounding environment information of the vehicle (for example, road information) and determine whether the pattern is changed due to the object based on the road information.

Seventh Embodiment

Figure 14:
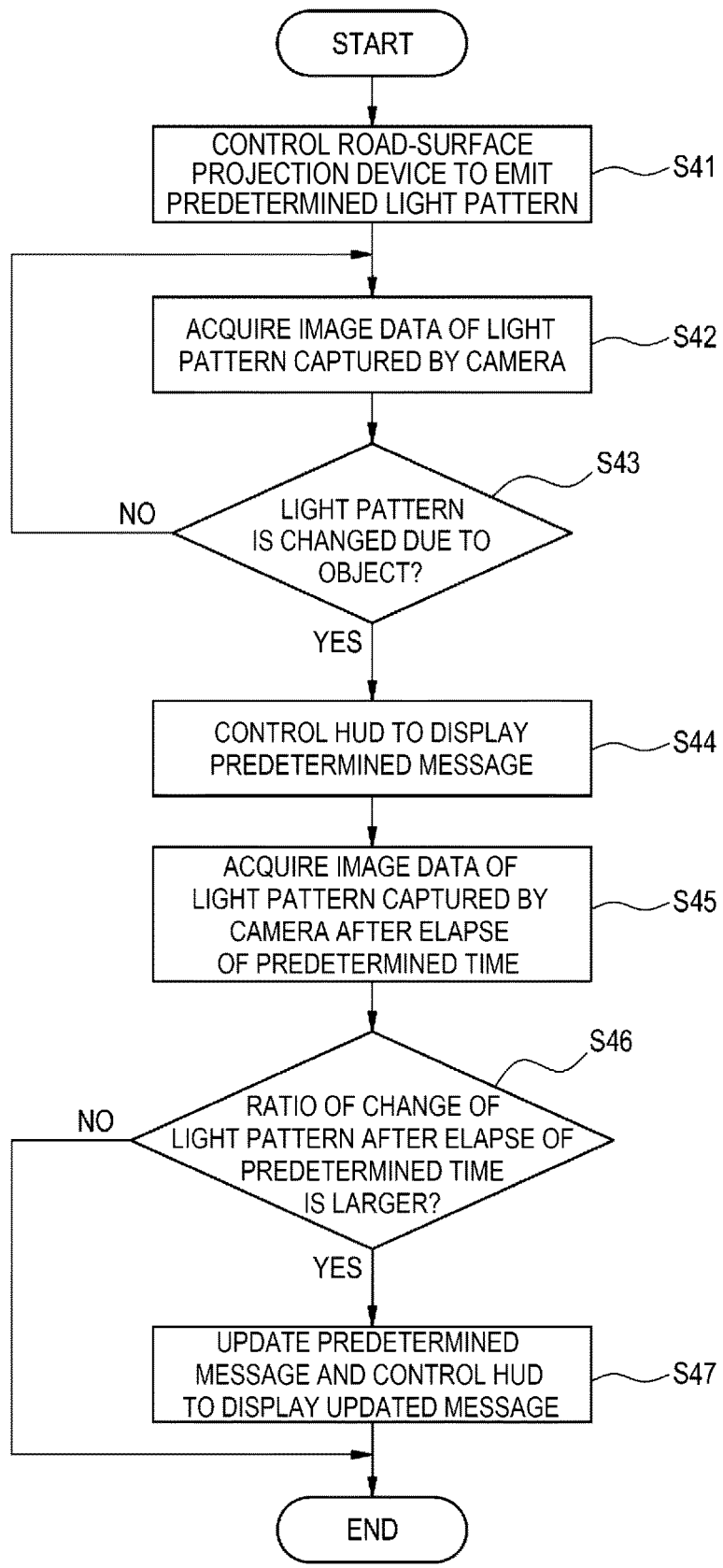
FIG. 14 is a flowchart for explaining an example of display control by a display control unit according to a seventh embodiment of the present invention.

Next, an example of display control of the display control unit 540 according to a seventh embodiment of the present invention (hereinafter, referred to as the seventh embodiment) will be described with reference mainly to FIG. 14. FIG. 14 is a flowchart for explaining an example of the display control by the display control unit according to the seventh embodiment. In the description of the seventh embodiment, description of members having the same reference numerals as those already described in the description of the first and sixth embodiments will be omitted for convenience of description.

When it is determined that a light pattern is changed due to an object (a pedestrian, other vehicles or the like), the display control unit 540 according to the first and sixth embodiments causes the HUD 543 to display a predetermined message. In contrast, the display control unit 540 according to the seventh embodiment causes the HUD 543 to display the predetermined message and then updates the message based on a moving direction of the object and causes the HUD 543 to display the updated message.

The present embodiment describes a case where the display control unit 540 determines the moving direction of the object based on a ratio of change of the light pattern of the captured image to a reference light pattern.

As shown in FIG. 14, in step S41, the display control unit 540 controls the road-surface projection device 542 to emit a predetermined light pattern toward a road surface based on surrounding environment information and the like acquired from the vehicle control unit 3. Next, in step S42, the display control unit 540 acquires image data obtained by capturing the light pattern projected on the road surface with the camera 6 from the vehicle control unit 3. Next, in step S43, the display control unit 540 determines whether the light pattern is changed due to the object based on the image data obtained by capturing with the camera 6.

When it is determined in step S43 that the light pattern is changed (YES in step S43), in step S44, the display control unit 540 controls the HUD 543 to display the predetermined message as shown in FIGS. 12A and 12B, for example. When it is determined in step S43 that the light pattern is not changed (NO in step S43), the display control unit 540 returns to control of step S42. Since steps S41 to S44 are the same as steps S21 to S24 according to the fifth embodiment except that the following additional processing is performed in step S43, detailed description thereof will be omitted.

In the present embodiment, in step S43, the display control unit 540 calculates the ratio of change of the light pattern of the captured image to the reference light pattern (hereinafter, referred to as the ratio of change of the light pattern of the captured image), and stores it in a memory of the display control unit 540. The ratio of change of the light pattern of the captured image may be stored in the storage device 11.

Next, in step S45, the display control unit 540 acquires the image data obtained by capturing the light pattern projected on the road surface with the camera 6 after an elapse of a predetermined time from the vehicle control unit 3.

In step S46, the display control unit 540 calculates a ratio of change in the light pattern of the captured image after the elapse of the predetermined time, and compares the ratio of change of the light pattern of the captured image after the elapse of the predetermined time with the ratio of change of the light pattern of the captured image before the elapse of the predetermined time stored in the memory of the display control unit 540. When it is determined that the ratio of change of the light pattern of the captured image after the elapse of the predetermined time is larger than the ratio of change of the light pattern of the captured image before the elapse of the predetermined time (YES in step S46), the display control unit 540 determines that the object is approaching the vehicle. In step S47, the display control unit 540 updates a message of object information displayed on the HUD 543 that the object is approaching, and causes the HUD 543 to display the updated message.

When it is determined in step S46 that the ratio of change of the light pattern of the captured image after the elapse of the predetermined time is smaller than or equal to the ratio of change of the light pattern of the captured image before the elapse of the predetermined time (NO in step S46), the display control unit 540 causes the message of the object information displayed on the HUD 543 to be continuously displayed as it is. When it is determined in step S46 that the ratio of change of the light pattern of the captured image after the elapse of the predetermined time is smaller than the ratio of change of the light pattern of the captured image before the elapse of the predetermined time, the display control unit 540 may update the message of the object information displayed on the HUD 543 that the object is moving away, and cause the HUD 543 to display the updated message.

In this way, the display control unit 540 determines whether the light pattern is changed due to the object based on the image obtained by capturing the light pattern emitted by the road-surface projection device 542 with the camera 6. Then, the display control unit 540 controls the HUD 543 to display the predetermined message toward an occupant of a vehicle according to a determination result. Thereby, for example, when the light pattern is changed due to presence of the object, the occupant may be notified of the presence of the object.

The display control unit 540 calculates and compares ratios of change of the light pattern of the captured image captured before and after the elapse of the predetermined time. Then, the display control unit 540 updates the message displayed on the HUD 543 based on a comparison result. Thereby, the occupant of the vehicle may confirm the moving direction of the object.

Similarly to the fifth embodiment, it is determined whether the light pattern is changed due to the object based on the image obtained by capturing the light pattern emitted onto the road surface with the camera 6 in the present embodiment, but the present invention is not limited thereto. For example, similarly to the sixth embodiment, it may be determined whether the light pattern is changed due to the object based on the image obtained by capturing the light pattern emitted onto the road surface with the camera 6 and information on the vehicle.

In the present embodiment, the moving direction of the object is determined based on the ratio of change of the light pattern of the captured image before and after the elapse of the predetermined time, but the present invention is not limited thereto.

Although the embodiments of the present invention have been described, it goes without saying that the technical scope of the present invention should not be interpreted as being limited by the description of the present embodiments. It is to be understood by those skilled in the art that the present embodiments are merely examples and various modifications may be made within the scope of the invention described in the claims. The technical scope of the present invention should be determined based on the scope of the invention described in the claims and the scope of equivalents thereof.

The first to fourth embodiments have described the light pattern ahead of, behind or surrounding the vehicle 1, but the present invention is not limited thereto. For example, a captured image or a CG image of a light pattern emitted onto a left or right side of the vehicle may be displayed on the HUD.

In the first to fourth embodiments, the image indicating the light pattern as viewed from above is displayed on the HUD, but the present invention is not limited thereto. For example, when the vehicle 1 includes a car navigation system (not shown), the image indicating the light pattern as viewed from above may be displayed on a screen of the car navigation system.

The first to fourth embodiments describe a case where the vehicle display system 4 has a configuration capable of displaying both the captured image and the CG image of the light pattern, and the occupant of the vehicle 1 selects any one of the captured image or the CG image of the light pattern as the image of the light pattern to be displayed on the HUD 43 by the HMI 8, but the present invention is not limited thereto. The vehicle display system 4 may be configured such that only one of the captured image and the CG image of the light pattern may be displayed. For example, the vehicle 1 does not include the cameras 6L, 6R dedicated to the light pattern imaging, and the vehicle display system 4 may be a system that displays only the CG image of the light pattern on the HUD 43.

In the fifth to seventh embodiments, the predetermined message is displayed on the HUD, but the present invention is not limited thereto. For example, when the vehicle includes the car navigation system (not shown), the image indicating the predetermined message may be displayed on the screen of the car navigation system.

In the fifth to seventh embodiments, the predetermined message is visually displayed, but the present invention is not limited thereto. The predetermined message may be displayed audibly. For example, a predetermined notification sound may be output from the sound output device (for example, a speaker, or the like) provided inside the vehicle. The notification sound may be output from the speaker of the HUD or the car navigation system.

In the first to seventh embodiments, the common display control units 40 and 540 are provided for the lighting devices 41 and 541, the road-surface projection devices 42 and 542, and the HUD 43 and 543, but separate display control units may be provided for each. In the first to seventh embodiments, the vehicle control unit 3 and the display control units 40, 540 are provided as separate components, but the vehicle control unit 3 and the display control units 40, 540 may be integrally configured. In this respect, the display control units 40, 540 and the vehicle control unit 3 may be formed of a single electronic control unit. In this case, the vehicle display systems 4, 504 include the vehicle control unit 3.

This application is based on Japanese Patent Application 2018-152958 filed on Aug. 15, 2018 and Japanese Patent Application 2018-152959 filed on Aug. 15, 2018, and contents of which are incorporated by reference herein.

The invention claimed is:
1. A vehicle display system provided in a vehicle, the vehicle display system comprising:
a projector configured to project a light pattern on a road surface outside the vehicle;

a processor configured to determine whether the light pattern is changed due to an object based on an image obtained by capturing the light pattern projected by the projector; and at least one of a display and a speaker configured to output a predetermined message to an occupant of the vehicle according to a determination result of the processor, wherein the processor calculates, based on a captured image of the light pattern obtained by capturing before an elapse of a predetermined time, a ratio of change of the light pattern of the captured image to a reference light pattern, calculates, based on an image of the light pattern obtained by capturing after the elapse of the predetermined time, a ratio of change of the light pattern of the captured image to the reference light pattern, and compares the ratios of change of the light pattern of the captured image captured before and after the elapse of the predetermined time to the reference light pattern, and wherein the at least one of a display and a speaker updates the predetermined message and outputs the updated predetermined message to the occupant of the vehicle according to a comparison result of the processor.

2. The vehicle display system according to claim 1, wherein the projector is configured to project the light pattern on the road surface around the vehicle.

3. The vehicle display system according to claim 2, wherein the light pattern is a light pattern surrounding a periphery of the vehicle.

4. The vehicle display system according to claim 1, wherein the light pattern is a light pattern projected to a region behind the vehicle.

5. The vehicle display system according to claim 1, wherein the at least one of a display and a speaker includes the display located inside the vehicle and configured to display information on the vehicle, and wherein the predetermined message is displayed on the display.

6. The vehicle display system according to claim 1, wherein the at least one of a display and a speaker includes the speaker located inside the vehicle and configured to output a predetermined notification sound, and wherein the predetermined message is output as the notification sound from the speaker.

7. A vehicle comprising:

the vehicle display system according to claim 1; and at least one camera configured to capture the light pattern projected by the projector.

\* \* \* \* \*